United States Patent
Inoue et al.

(10) Patent No.: US 7,322,600 B2
(45) Date of Patent: Jan. 29, 2008

(54) HEAD-PROTECTING AIRBAG

(75) Inventors: Michio Inoue, Aichi-ken (JP);
Toshinori Tanase, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 382 days.

(21) Appl. No.: 10/994,532

(22) Filed: Nov. 23, 2004

(65) Prior Publication Data
US 2005/0121887 A1 Jun. 9, 2005

(30) Foreign Application Priority Data
Nov. 27, 2003 (JP) ............................. 2003-397638
Mar. 15, 2004 (JP) ............................. 2004-072704

(51) Int. Cl.
*B60R 21/213* (2006.01)
(52) U.S. Cl. ................................. 280/730.2; 280/743.2
(58) Field of Classification Search ............. 280/730.2, 280/743.2; *B60R 21/213*
See application file for complete search history.

(56) References Cited

U.S. PATENT DOCUMENTS

| | | | | |
|---|---|---|---|---|
| 5,765,863 A * | 6/1998 | Storey et al. | ............... | 280/729 |
| 6,095,557 A * | 8/2000 | Takimoto et al. | ............. | 280/739 |
| 6,164,696 A * | 12/2000 | Ellerbrok et al. | ........ | 280/743.2 |
| 6,672,612 B2 * | 1/2004 | Sauer et al. | ............. | 280/730.2 |
| 6,851,707 B2 * | 2/2005 | Bakhsh et al. | ............ | 250/730.2 |
| 6,976,705 B2 * | 12/2005 | Klaiber et al. | ........... | 280/743.1 |
| 7,077,425 B2 * | 7/2006 | Ogawa et al. | ........... | 280/730.2 |
| 7,243,943 B2 * | 7/2007 | Ohrvall et al. | ........... | 280/730.2 |
| 2002/0158451 A1 * | 10/2002 | Nusshor | .................. | 280/730.2 |
| 2003/0230876 A1 * | 12/2003 | Ohrvall et al. | ........... | 280/730.2 |
| 2005/0062268 A1 * | 3/2005 | Inoue et al. | ............. | 280/730.2 |

(Continued)

FOREIGN PATENT DOCUMENTS

GB   2 383 780 A   7/2003

(Continued)

OTHER PUBLICATIONS

Foreign communication from Chinese Patent Office for corresponding Chinese Patent Application dated Apr. 7, 2006.

*Primary Examiner*—Paul N. Dickson
*Assistant Examiner*—Joselynn Y. Sliteris
(74) *Attorney, Agent, or Firm*—Posz Law Group, PLC

(57) ABSTRACT

A head-protecting airbag of the present invention includes an airbag body having a gas admissive portion for covering side windows upon deployment, and a belt for pulling a lower part of the airbag body toward exterior of vehicle during deployment. The gas admissive portion includes an initially inflatable portion located along upper edge of the airbag body, and a protective portion located at side of an occupant's head. The protective portion includes a main cell that inflates thickly when a temporary joint joining the inner wall and the outer wall is separated. The airbag body folded together with the belt and housed above the windows is provided, in the initially inflatable portion, with a folded and piled portion folded and piled in vertical direction, and below the folded and piled portion, with a roll-folded portion rolled toward exterior of vehicle from lower edge side. The head-protecting airbag of the present invention is developed smoothly and stably in a clearance between the side windows and occupants' heads, even if the clearance is narrow.

14 Claims, 22 Drawing Sheets

U.S. PATENT DOCUMENTS

2006/0082107 A1* 4/2006 Bakhsh et al. ........... 280/730.2
2007/0138778 A1* 6/2007 Takemura et al. ....... 280/743.1

FOREIGN PATENT DOCUMENTS

| GB | 2 388 081 A | 11/2003 |
| JP | A-11-321528 | 11/1999 |
| JP | A-2002-193065 | 7/2002 |
| JP | A-2003-34209 | 2/2003 |
| JP | 2003320920 A * | 11/2003 |

* cited by examiner

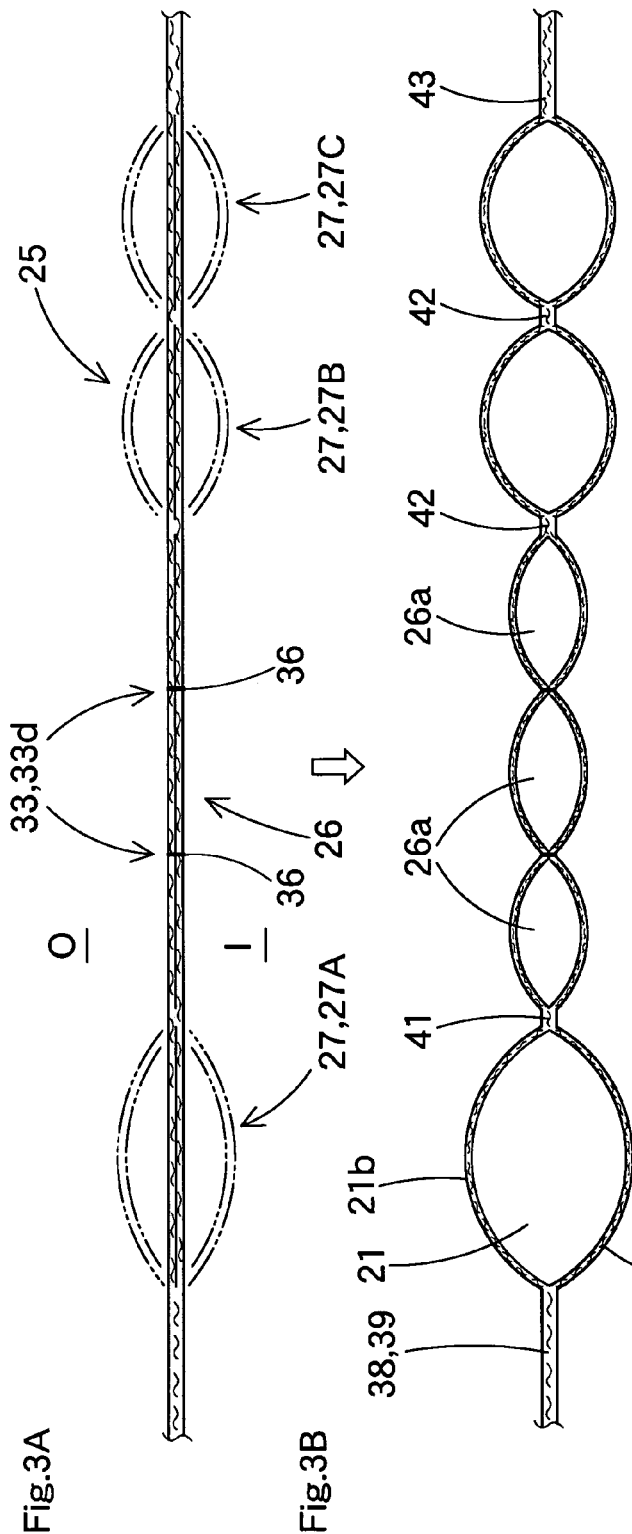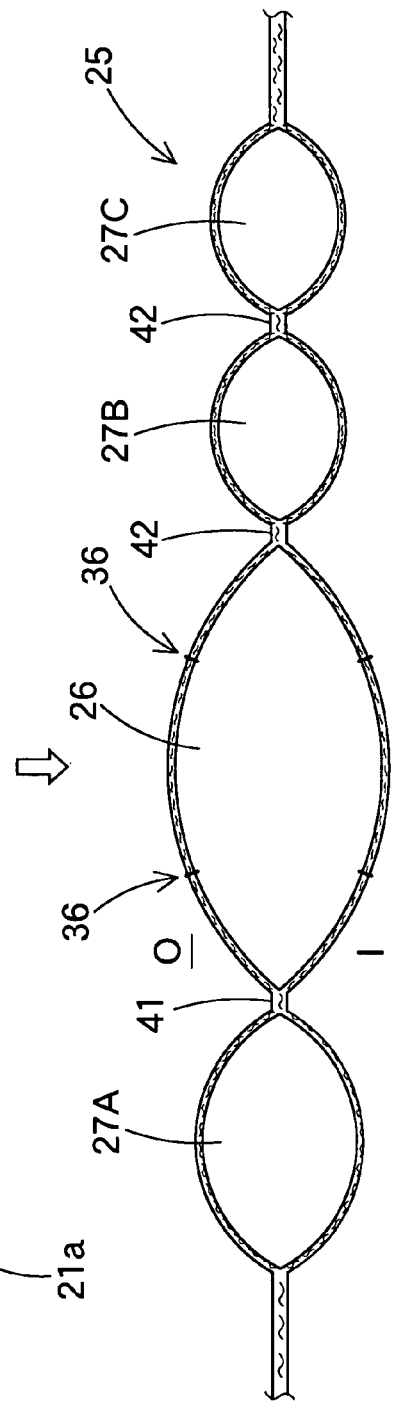
Fig.3A Fig.3B Fig.3C

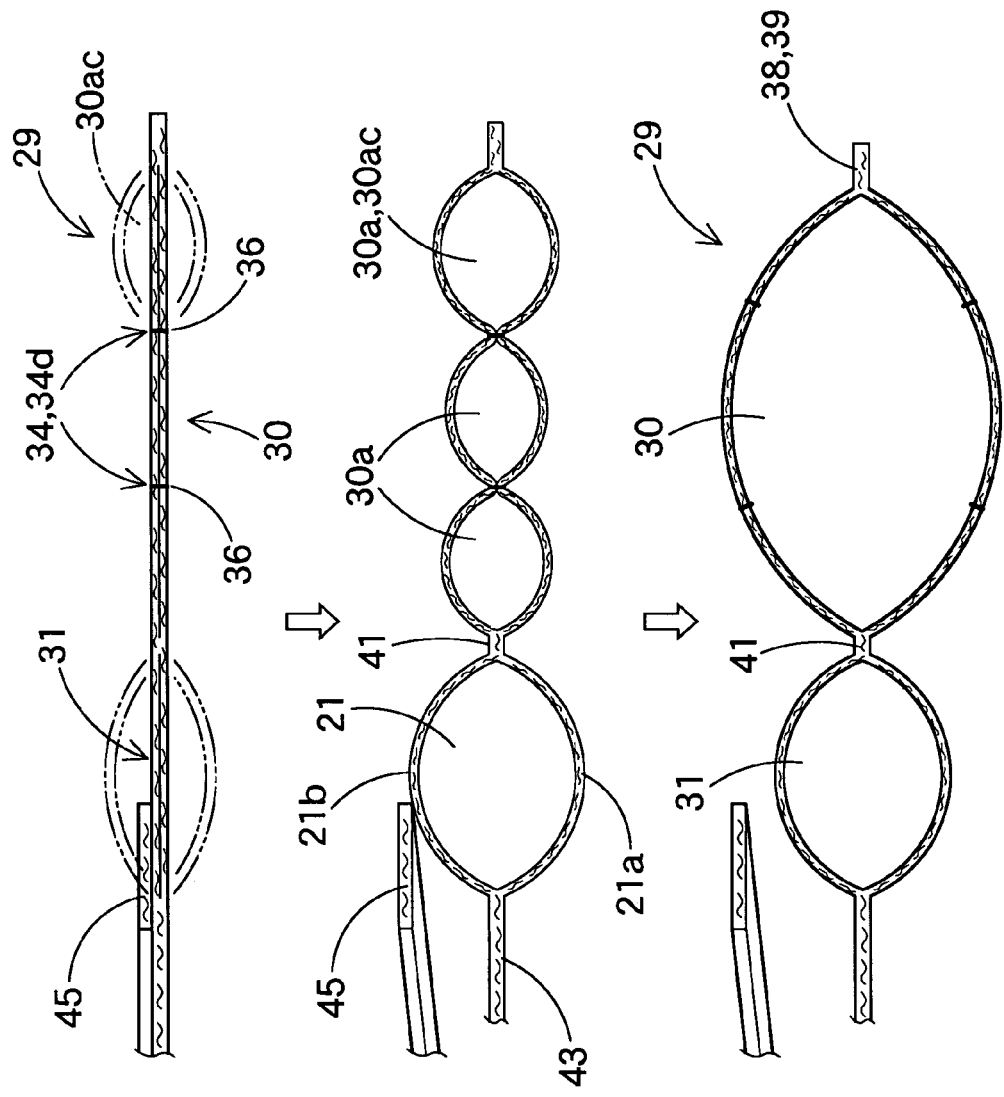

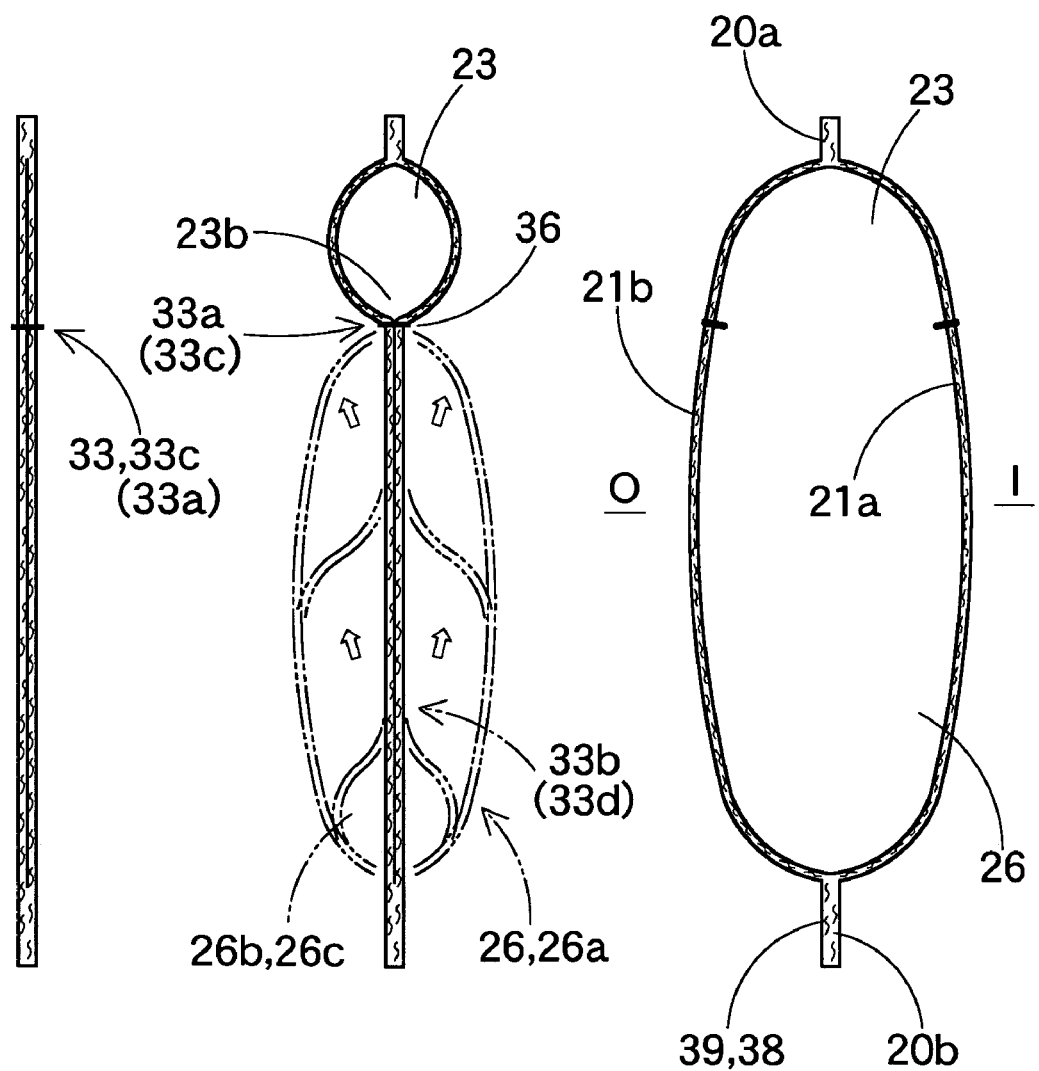

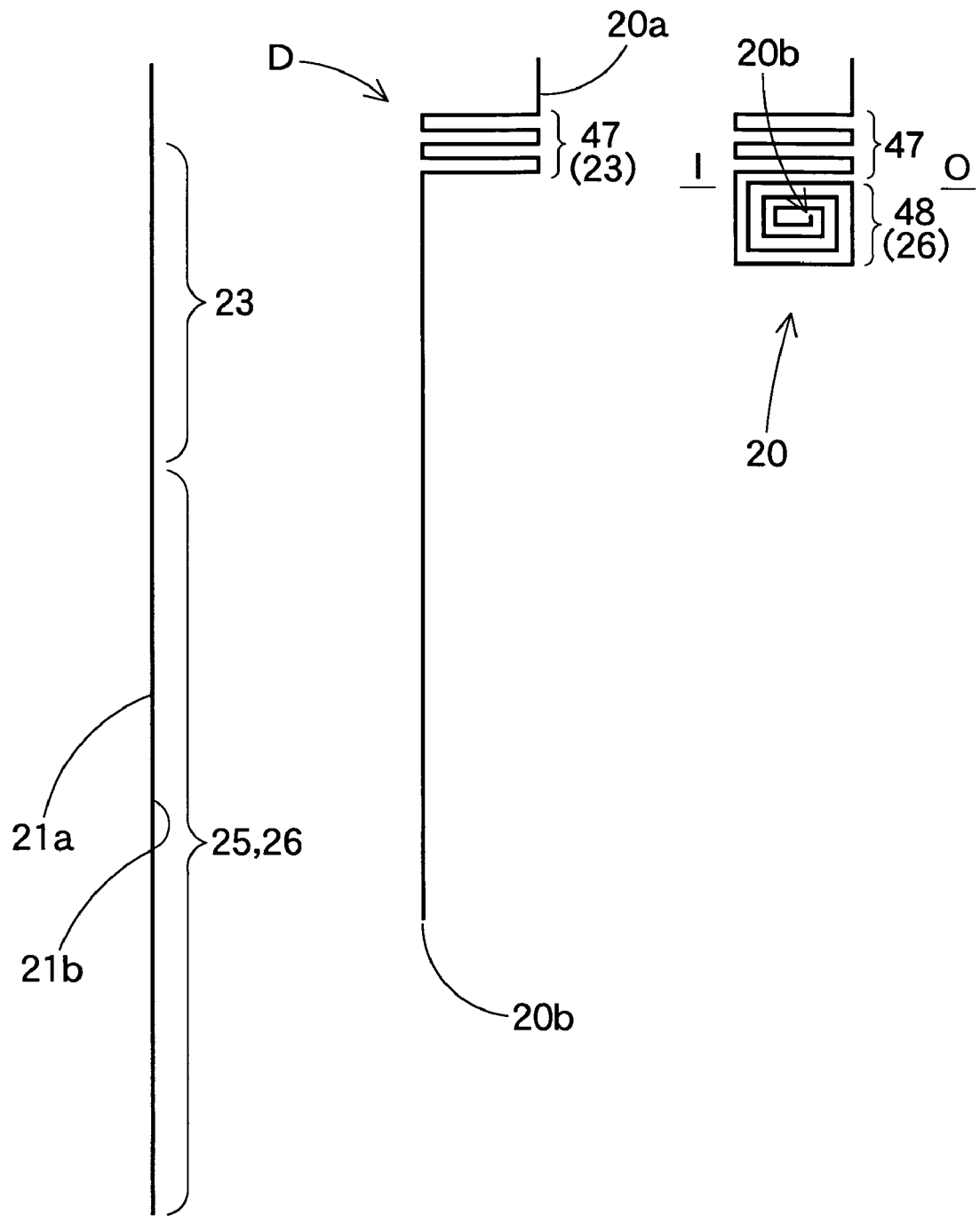

HEAD-PROTECTING AIRBAG

The present application claims priorities from Japanese Patent Application No. 2003-397638 of Inoue et al., filed on Nov. 27, 2003 and Japanese Patent Application No. 2004-072704 of Inoue et al., filed on Mar. 15, 2004, the disclosures of which are hereby incorporated into the present application by reference.

BACKGROUND OF THE INVENTION

1. Field of the Invention

The present invention relates to a head-protecting airbag which, when fed with inflation gas, is deployable downward from upper edge of side windows of a vehicle to protect occupants' heads.

2. Description of Related Art

In the prior art, Japanese Patent Laid-Open No. Hei 11-321528 is illustrative of a head-protecting airbag which is folded and housed above side windows, and is deployable to cover side windows while unfolding when fed with inflation gas.

This head-protecting airbag includes an inner wall and an outer wall which form a gas admissive portion that admits inflation gas therein. From a flatly developed state with the inner wall and outer wall overlaid on each other, the airbag is folded in a bellows of a certain width to bring its lower edge close to its upper edge. Then the airbag is housed between a roof head lining and an inner panel as part of a vehicle body above side windows.

Although airbags thus housed swiftly unfold and deploy when fed with inflation gas, differences of vertical dimensions in various parts of the airbags and slight errors in folding width tend to vary positions of lower edges of completely folded airbags from airbag to airbag. For example, one airbag is directed toward a vehicle's interior, and another is directed toward a vehicle's exterior at the lower edge.

In an initial stage of inflation, the airbags thus housed tend to protrude in directions to which lower edges of the airbags are directed, and protruding directions are not uniform. Therefore, the airbags need to be improved to deploy uniformly and smoothly in clearances between side windows and occupants' heads even in a case where the clearances are narrow.

SUMMARY OF THE INVENTION

The present invention contemplates to solve the above-mentioned problem, and therefore, has an object to provide a head-protecting airbag capable of deploying in a clearance between side windows and occupants' heads smoothly and stably even in case the clearance is narrow.

The head-protecting airbag according to the present invention is folded and housed in upper edges of side windows and is deployable downward when fed with inflation gas. The airbag includes an airbag body for covering the side windows upon deployment, and a belt. The airbag body includes a gas admissive portion which inflates by admitting inflation gas between a an airbag's inner wall and a an airbag's outer wall. The gas admissive portion includes an initially inflatable portion located along an upper edge of the airbag body and admitting inflation gas in the initial stage of inflation, and a protective portion located below the initially inflatable portion and to be disposed at a side of an occupant's head as the airbag is completely inflated. The protective portion includes a main cell having a temporary joint. The temporary joint joins the inner wall and the outer wall together, and separates them when internal pressure of the protective portion rises along with inflation, such that the main cell is inflated thinly before the separation of the inner wall and outer wall by the temporary joint, and inflated thickly after the separation. The belt is located in an exterior side of the airbag body, with its upper end connected to the vicinity of an upper edge of the airbag body, and with its lower end connected to a position below the initially inflatable portion of the airbag body, such that the belt pulls a lower part of the airbag body toward exterior of the vehicle during deployment. The airbag body is provided: in at least part of the initially inflatable portion, with a folded and piled portion formed by folding and piling the inner wall and outer wall on folds together with the belt; and below the folded and piled portion, with a roll-folded portion rolled toward the exterior of vehicle from a lower edge side, such that the mid ally inflatable portion pushes out the protective portion downward when inflated with inflation gas.

In the head-protecting airbag of the present invention, if inflation gas flows in the airbag housed above side windows, the initially inflatable portion of the airbag body is inflated firstly. At least a part of the initially inflatable portion located along the upper edge of the airbag body is the folded and piled portion formed by folding and piling the inner wall and outer wall together on folds so as to push out the protective portion downward when inflated by inflation gas. Since the folded and piled portion is folded in a fashion more unfoldable than the roll-folded portion, when fed with inflation gas, the folded and piled portion immediately unfolds and pushes a portion below thereof, or the protective portion, or a lower part of the airbag body including the roll-folded portion downward. Moreover, since the airbag is provided in its exterior side with the belt joining the vicinity of upper edge of the airbag body and lower part of the airbag body, the lower part of the airbag body is regulated by the belt to develop outward. Consequently, the lower part of the airbag body including the roll-folded portion is pushed out along side windows swiftly. Even if an occupant's head is located close to side windows, accordingly, the lower edge of the airbag body cuts into a narrow triangular space between side windows and an upper end of the occupant's head from upper side. Especially, since the lower part of the airbag is the roll-folded portion which does not unfold as easily as the folded and piled portion, the lower edge easily enters into the space between side windows and the occupant's head while keeping thin and compact configuration.

If the initially inflatable portion further inflates from this state, the initially inflatable portion pushes an exterior and upper end portion of the occupant's head inward of the vehicle, thereby widens the triangular space. Thus the lower part of the airbag body pushed out by the initially inflatable portion cuts in the widened space between side windows and the upper end of the occupant's head.

Then a lower part of the folded and piled portion enters into the widened space, and the roll-folded portion enters therein while unfolding. Since the roll-folded portion is roll-folded toward exterior from the lower edge of the airbag body, the portion is guided by the occupant's head when unrolled even if the portion engages the head. Consequently, the airbag body smoothly unfolds and completes development up to an area below the occupant's head. Regarding an unfolded portion of the roll-folded portion, since the portion keeps a thin configuration, the portion enters into the space smoothly and goes unfolded.

In the main cell of the protective portion, at this time, since internal pressure is still low, the temporary joint still keeps the vehicle's inner wall and outer wall joined. Accordingly, the main cell completes development in a thin state, so that the main cell unfolds and deploys at side of the occupant's head smoothly and stably even if a space between side windows and the occupant's head is narrow.

After the protective portion is completely developed, the temporary joint separates the inner and outer walls along with an increase of internal pressure of the main cell, and then the main cell inflates a portion where the temporary joint used to be, and protects the occupant's head with sufficient cushioning property or impact absorbing stroke.

Therefore, the head-protecting airbag of the present invention is capable of deploying in a clearance between side windows and the occupant's head smoothly and stably even in a case where the clearance is narrow, and further protecting the head with sufficient cushioning property.

Up-down and front-rear in this specification correspond to up-down and front-rear of the vehicle on which the airbag is mounted, and so do "obliquely upward" and "obliquely downward" of the airbag.

Although the lower end of the belt has to be connected to a lower part of the airbag body, it is sufficient that the lower edge of the airbag body is directed toward an exterior in the initial stage of inflation. Accordingly, the lower end of the belt has only to be connected to a part of the airbag body below the initially inflatable portion, and therefore, may be connected to a portion immediately below the initially inflatable portion, for example. In addition, the upper end of the belt may be connected not only to the airbag body itself, but also to part of the vehicle body separated from the airbag body, on condition that the position is around the upper edge of the airbag body.

It is desired that the temporary joint includes a substantially vertical portion so as to separate the inner and outer walls from lower ends thereof.

With this construction, the vehicle's inner wall and outer wall are separated by the temporary joint from a lower side to an upper side of the main cell. That is, if the inner and outer walls are constructed to be separated from the upper end of the temporary joint, the upper part of the main cell starts to bulge before completion of development since the head-protecting airbag is constructed to develop downward from the upper side of side windows, so that access of inflation gas to the lower part of the main cell is delayed, and quick development of the main cell is hindered. With the above arrangement, however, separation of the temporary joint of the vehicle's inner wall and outer wall proceeds from the lower side to the upper side of the main cell, so that the separation starts in a condition that inflation gas has reached the lower part of the main cell. In other words, the main cell has completed development before the separation starts, so that stable development of the main cell is assured.

In this case, it is desired that the main cell includes a gas inlet port at a lower part thereof such that the main cell admits inflation gas from the lower side.

With this construction, a portion adjacent to the main cell in front-rear direction and communicated with the gas inlet port complete development prior to the main cell, so that the main cell completes development in further uninflated and thin state. Therefore, even if a clearance between the occupant's head and side windows is quite narrow, the main cell deploys easily in the clearance.

Moreover, the temporary joint in the main cell may adjoin the initially inflatable portion at upper end part thereof.

With this construction, when the inner wall and outer wall in the upper end part of the temporary joint are separated, the main cell and the initially inflatable portion inflate thickly in a communicated state, and increase its cushioning property.

It is more desired that an entire area of the initially inflatable portion is the folded and piled portion formed by folding and piling the inner wall and outer wall on folds, and an entire area below the initially inflatable portion is the roll-folded portion rolled toward exterior of vehicle from lower edge side.

With this construction, the entire area of the initially inflatable portion develops and inflates swiftly in the initial stage of inflation. Accordingly, the roll-folded portion is pushed out downward and along the side windows by the initially inflatable portion in cooperation with a regulation of the belt, so that a heavy occupant's head is pushed toward the interior quickly even if the head of the occupant of large build is proximate to the side windows, and a lower part of the airing body including the roll-folded portion enters into a clearance between the head and the side windows.

The folded and piled portion may be formed by a bellows-folding method that folds and piles overlapped inner and outer walls in vertical direction. Alternatively, it may be formed by folding and piling each of the inner and outer walls in vertical direction, or in exterior-interior direction of vehicle.

Not an entire area of the initially inflatable portion necessarily has to be a folded and piled portion. For example, it will also be appreciated that a part of the initially inflatable portion is bellows-folded in vertical direction from a state in which the inner wall and outer wall are overlapped, such that a folded and piled portion is formed, and a remaining portion of the initially inflatable portion below the folded and piled portion is located to encircle the roll-folded portion from exterior side to lower side.

Moreover, if the folded and piled portion is formed by bellows-folding the overlapped inner and outer walls, and the roll-folded portion is located along the folding direction of the folded and piled portion, the airbag body may be housed above the side windows with the roll-folded portion located obliquely below and toward the exterior or interior of the folded and piled portion.

It is more desired that the upper end of the belt is connected to either one longitudinal end of the airbag body, and the lower end is connected to the vicinity of longitudinal center in the lower edge of the airbag body.

With this arrangement, when the airing body is completely developed, the belt pulls the vicinity of the longitudinal center of the lower edge of the airbag body upward and toward the longitudinal end of the airbag body, so that a tension along the front-rear direction is exerted in the lower edge of the airing body. Thus the protective portion is smoothly developed even if the lower edge of the protective portion gets caught by an occupant's head slightly and is impeded in development right before completion of development, because the lower edge is pulled because of the tension.

Furthermore, if the airbag body is constructed to cover the interior side of a plurality of side windows and a pillar located between the side windows, the upper and lower ends of the belt may be located in the vicinity of the pillar.

With this construction, even if a clearance between the pillar and an occupant is narrow because of a protrusion of the pillar beyond the side windows, regulation by the belt toward the exterior helps the airbag body to develop downward along the pillar.

BRIEF DESCRIPTION OF DRAWINGS

FIGS. 3A, 3B and 3C are partial cross sections of the airbag of FIG. 2, taken along line III-III in FIG. 2, and show inflation process in order;

FIGS. 4A, 4B and 4C are partial cross sections of the airbag of FIG. 2, taken along line IV-IV in FIG. 2, and show the inflation process in order;

FIGS. 5A, 5B, and 5C are partial vertical sections of the airbag of FIG. 2, taken along line V-V in FIG. 2, and show inflation process in order;

FIGS. 6A, 6B and 6C illustrate folding process of the airbag of FIG. 2;

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
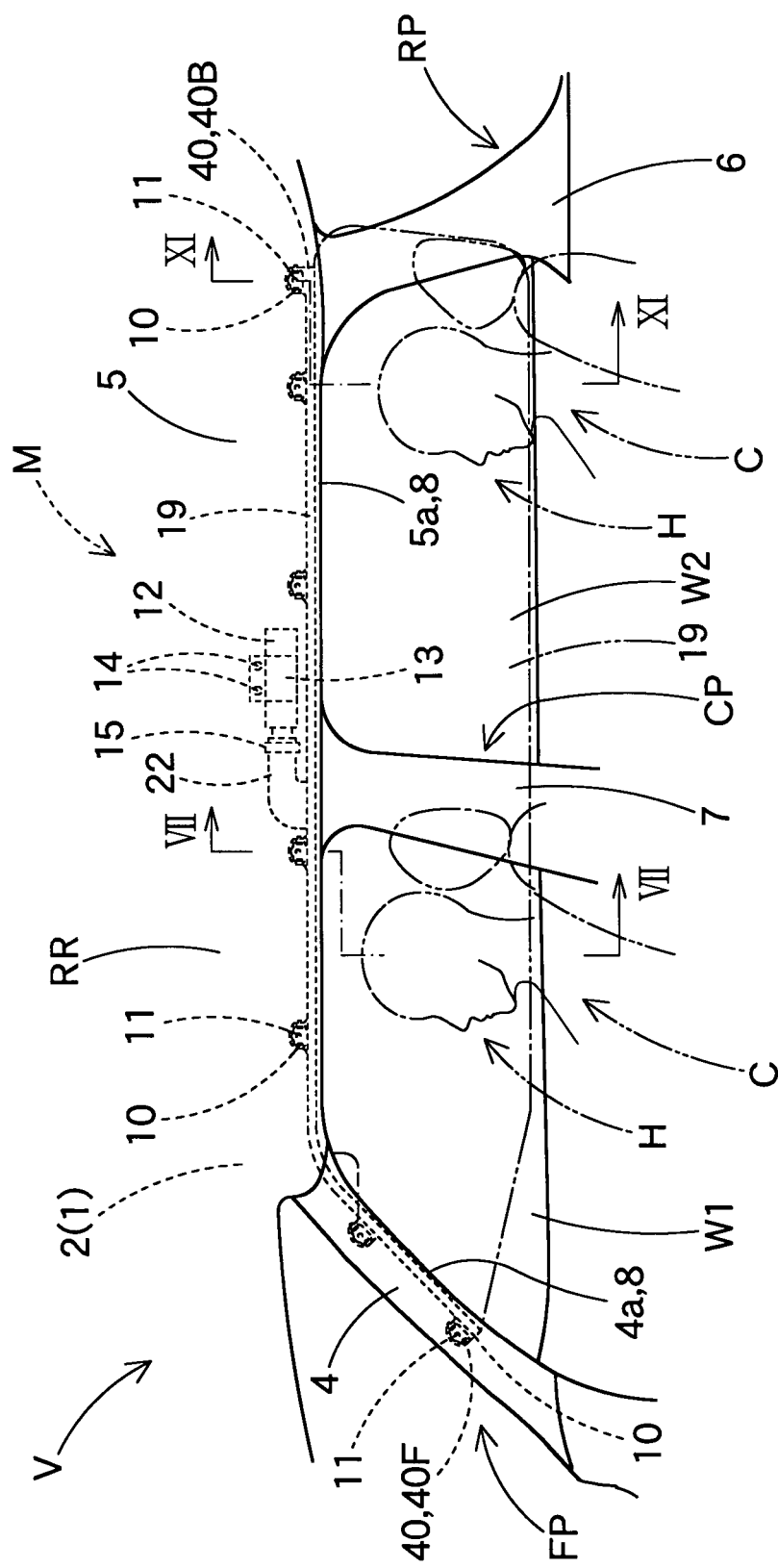
FIG. 1 is a schematic front view of a head-protecting airbag device employing an airbag according to the present invention, as mounted on a vehicle.
Figure 2:
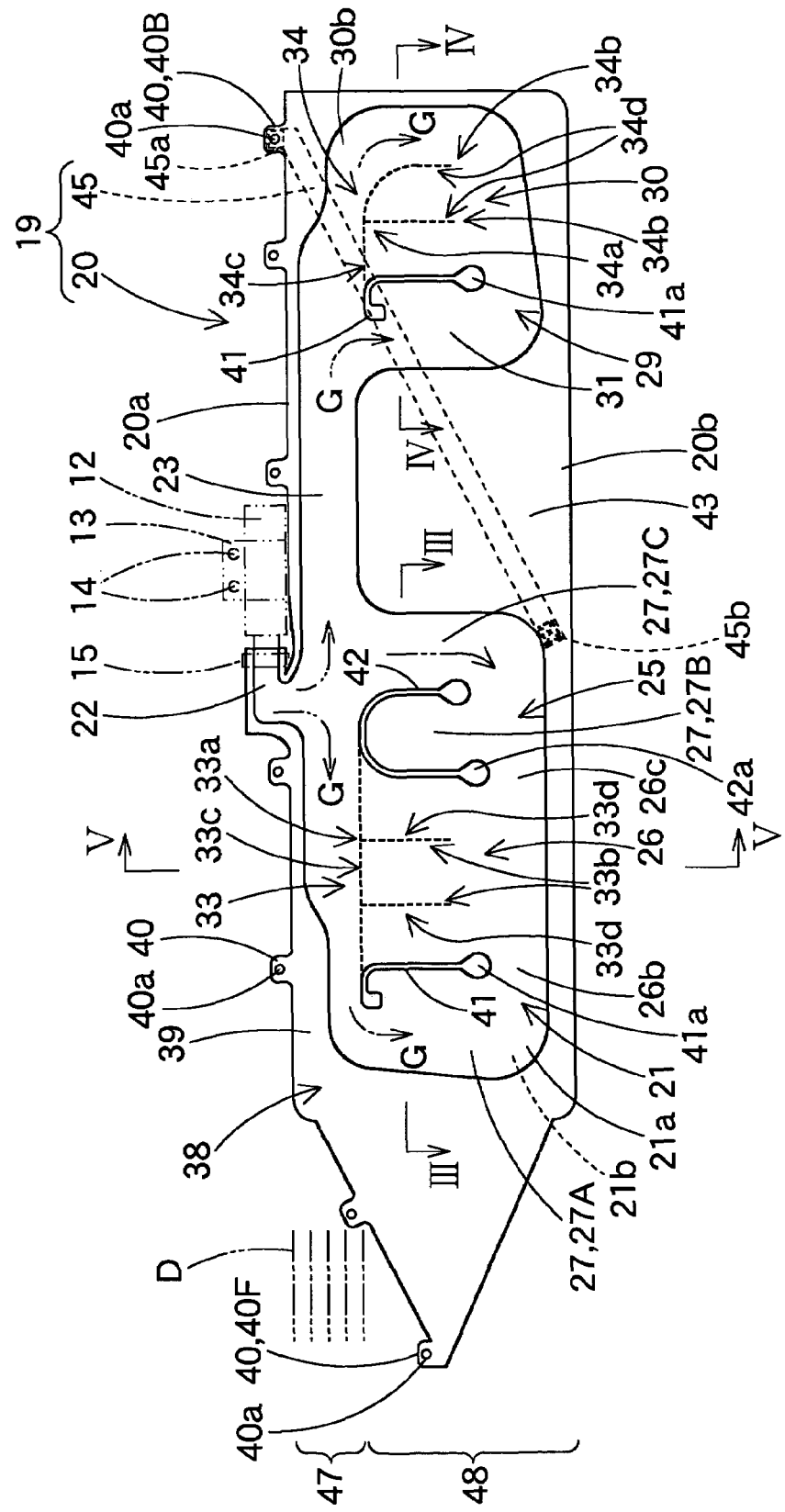
FIG. 2 is a front view of an embodiment of the airbag according to the present invention.

As shown in FIGS. 1 and 2, a head-protecting airbag 19 according to the present invention is employed in a head-protecting airbag device M mountable on a vehicle V. The head-protecting airbag device M includes the airbag 19, an inflator 12, mounting brackets 10 and 13, and an airbag cover 8. The airbag 19 is folded and housed along an upper edge of the side windows W1 and W2 inside the vehicle V, in a range from a lower edge part of a front pillar FP to an upper part of a rear pillar RP, via a lower edge of a roof side rail RR.

As shown in FIGS. 1 and 2, the inflator 12 has a substantially cylindrical shape. The inflator 12 is sheathed with a joint port 22 of the airbag 19 for introducing inflation gas, and connected with the airbag 19 by a clamp 15. The inflator 12 is secured to an inner panel 2 by a mounting bracket 13 in the roof side rail RR above the center pillar CP while being covered by a lower edge 5a of the roof head lining 5. The inner panel 2 is part of the vehicle body 1. The mounting bracket 13 is made of sheet metal, and is secured to the inner panel 2 by bolts 14 while holding the inflator 12.

Figure 7:
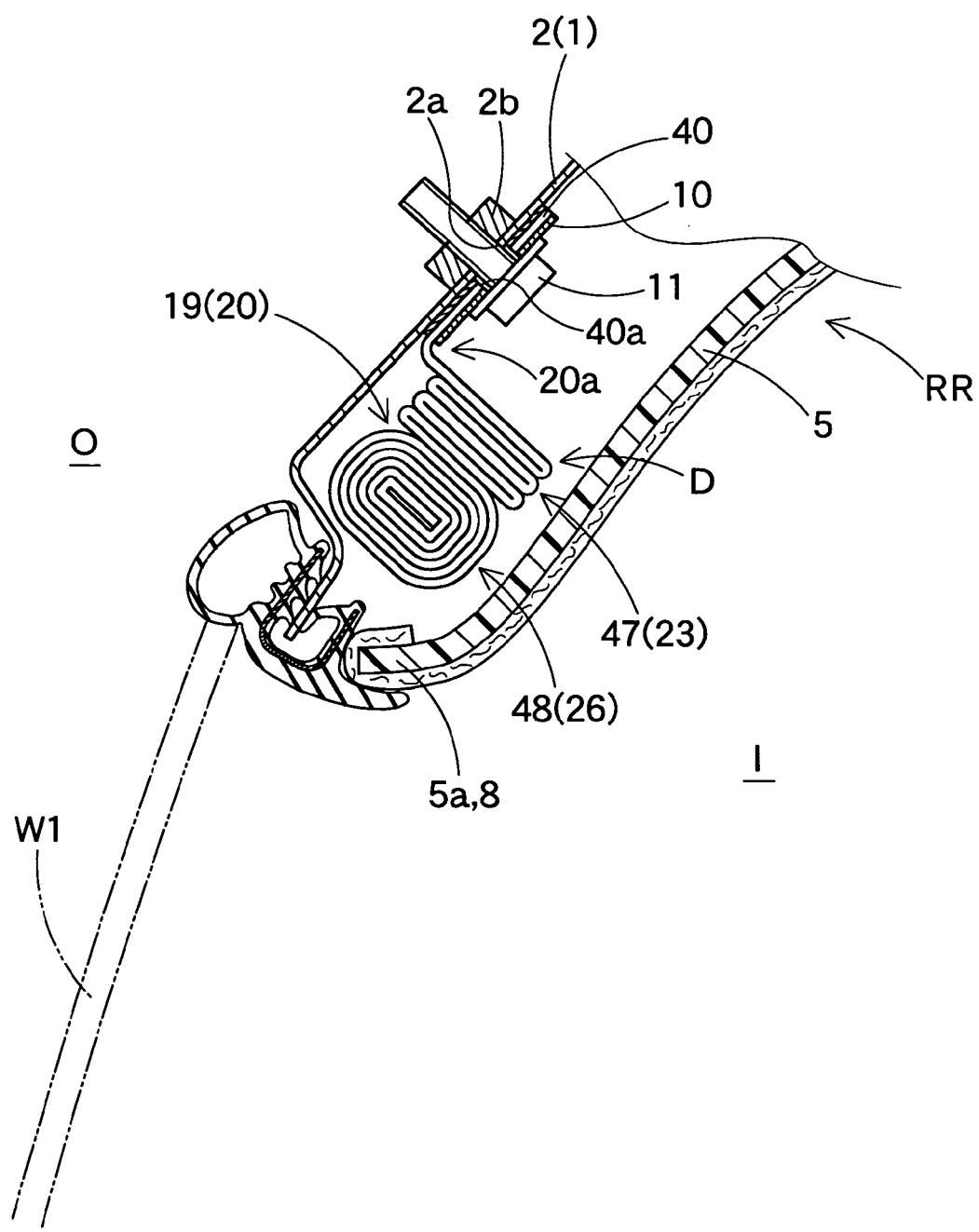
FIG. 7 is a schematic vertical section of the airbag of FIG. 2 as mounted on a vehicle, taken along line VII-VII of FIG. 1.
Figure 8A:
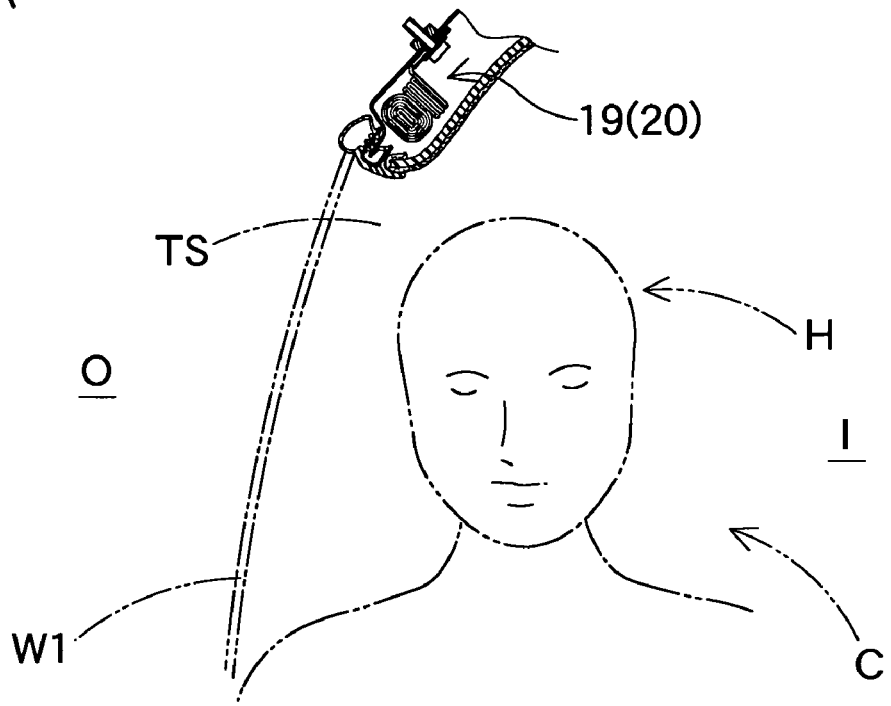
FIGS. 8A and 8B illustrate inflation process of the airbag of FIG. 2 in the vicinity of a main cell in order, taken along line VII-VII of FIG. 1.
Figure 8B:
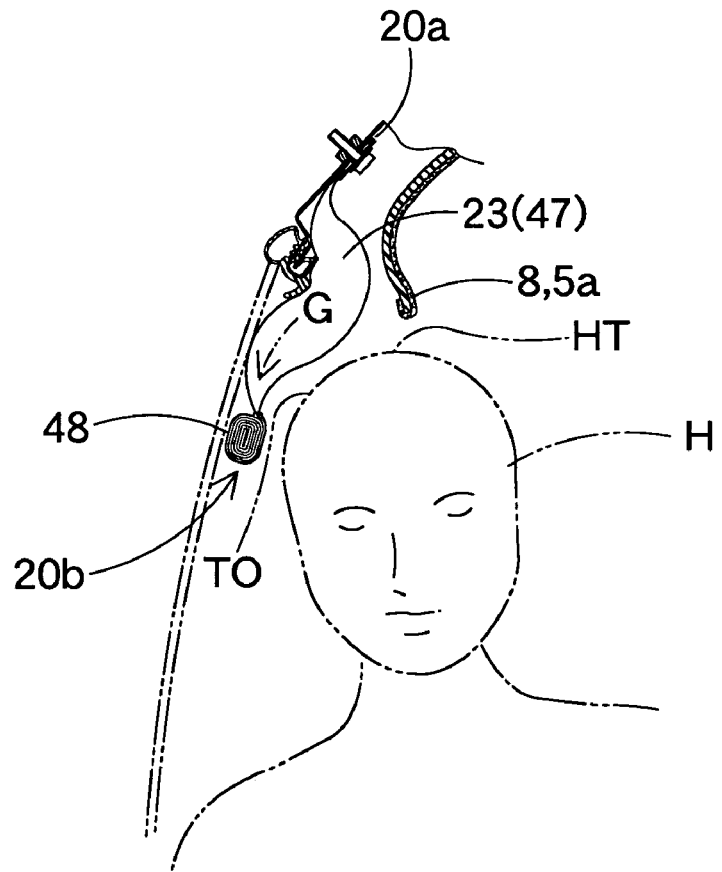
Figure 11:
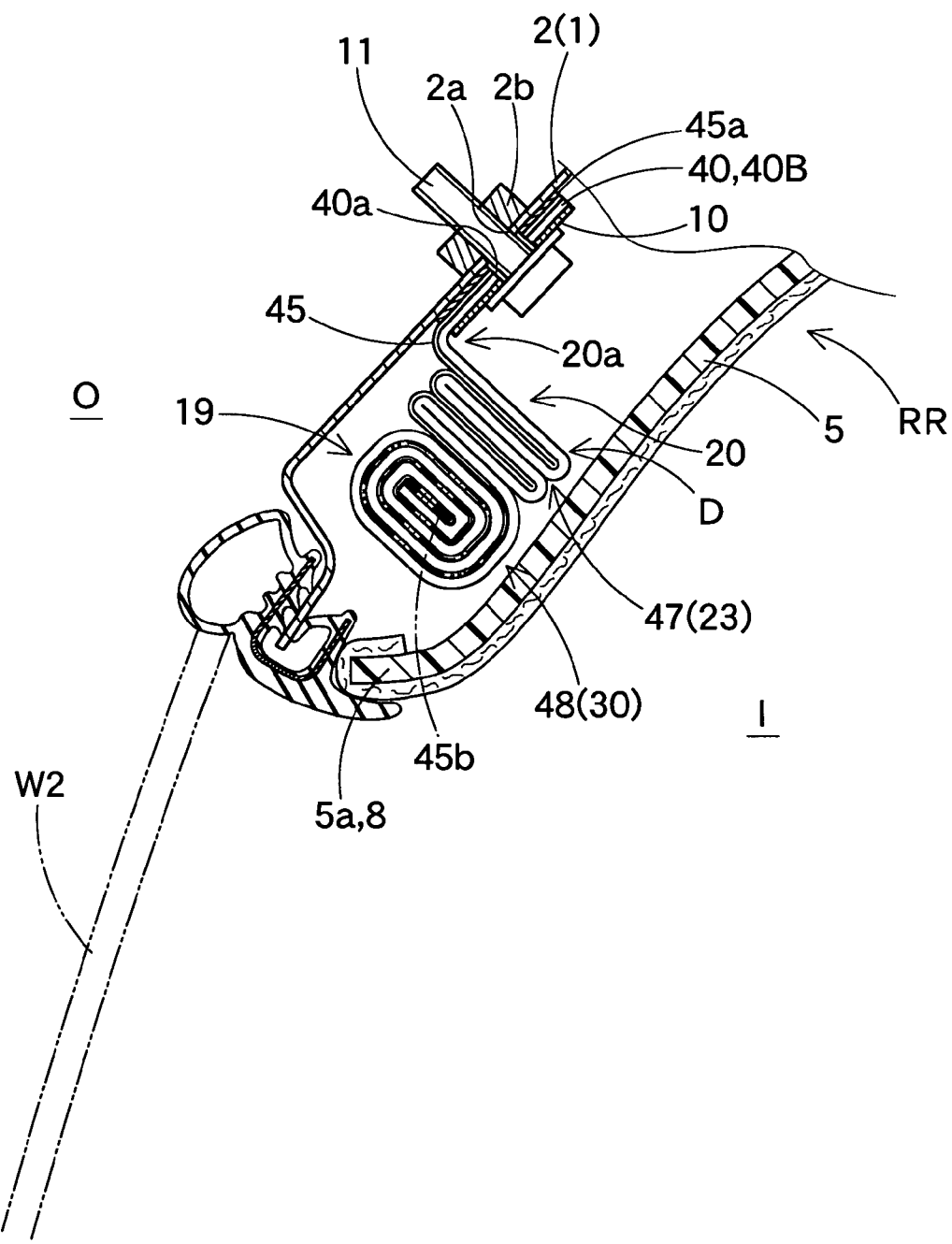
FIG. 11 is a schematic vertical section of the airbag of FIG. 2 as mounted on a vehicle, taken along line XI-XI of FIG. 1.

As shown in FIGS. 7 and 11, each of the mounting brackets 10 consists of two plates of sheet metal. The mounting bracket 10 is attached to a mounting portion 40 of the airbag 19 by putting the mounting portion 40 between the two plates, and secures the mounting portion 40 to the inner panel 2 by a mounting bolt 11. Each of the mounting bolts 11 is fastened into a mounting hole 2a formed in the inner panel 2 and provided with a nut 2b.

The airbag cover 8 is constituted by a lower edge 4a of a pillar garnish 4 arranged in the front pillar FP and a lower edge 5a of the roof head lining 5 arranged in the roof side rail RR. The front pillar garnish 4 and the roof head lining 5 are made from synthetic resin, and are attached to the vehicle's interior side of the inner panel 2 in the front pillar FP and the roof side rail RR. The roof head lining 5 is arranged from an upper part of the front pillar FP to an upper part of the rear pillar RP, via an upper pan of the center pillar CP.

As shown in FIGS. 1 to 5, the airbag 19 includes an airbag body 20 manufactured by hollow-weaving method of polyamide yarn or the like, and a flexible belt 45 made of fabric of polyamide yarn or the like. Although the airbag body 20 in the foregoing embodiment is not provided on the outer surface with silicone rubber coating or the like for preventing gas leakage, which is commonly applied, a coating may be applied to prevent gas leakage. The belt 45 is made of the remainder of material produced in manufacturing the airbag body 20.

When fed with inflation gas G from the inflator 12, the airbag body 20 is developed from folded state and deploys to cover vehicle's interior side of side windows W1, W2, pillar garnishes 7 and 6 of the center pillar CP and the rear pillar RP. The airbag body 20 includes a gas admissive portion 21 which admits inflation gas G inside to separate its airbag's inner wall 21a and airbag's outer wall 21b, and a non-admissive portion 38 which admits no inflation gas G.

The non-admissive portion 38 is formed by joining the walls 21a and 21b of the admissive portion 21, and includes a peripheral portion 39, a plurality of mounting portions 40, partitioning portions 41 and 42, and a panel portion 43. The peripheral portion 39 is located in an outer edge of the airbag body 20 and encircles the gas admissive portion 21.

Each of the mounting portions 40 is projected upward from the peripheral portion 39 in the upper edge 20a of the airbag body 20. The airbag body 20 includes seven mounting portions 40 in the illustrated embodiment. As shown in FIGS. 7 and 11, the mounting bracket 10 is attached to each of the mounting portions 40 for attachment to the inner panel 2. Each of the mounting portions 40 is provided with a mounting hole 40a to put a bolt 11 therethrough.

The panel portion 43 has a rectangular panel shape and is located between later-described front and rear protective portions 25 and 26 below a later-described gas feed passage 23. The panel portion 43 is adapted to define an entire shape of the airbag body 20, and also to reduce the time to complete inflation of the airbag 19 by reducing a volume of the gas admissive portion 21.

The partitioning portions 41 and 42 are located inside front and rear protective portions 25 and 29. Each one partitioning portion 41 having an inverted-J shape as viewed from the vehicle's interior is located in front part of each of the protective portions 25 and 29. The partitioning portion 42 has an inverted-U shape as viewed from vehicle's interior, and is located in a rear part of the front protective portion 25. The partitioning portions 41 and 42 are adapted to provide cells 26, 27, 30 and 31 when the front and rear protective portions 25 and 29 are inflated, and to regulate the thicknesses of the protective portions 25 and 29 such that the protective portions 25 and 29 are inflated flatly, not spherically.

In the front protective portion 25, the partitioning portions 41 and 42 provide four cells, i.e., an auxiliary cell 27A, a main cell 26, auxiliary cells 27B and 27C, in backward order, at complete inflation as shown in FIGS. 3C and 5C. In the rear protective portion 29, the partitioning portion 41 provides two cells, i.e., an auxiliary cell 31 and a main cell 30, in backward order, at complete inflation as shown in FIG. 4C.

Each of the cells 26, 27, 30 and 31 partitioned by the partitioning portion 41 or 42 reduces a front-rear dimension of the airbag body 20 upon inflation, such that a tension in the front-rear direction is exerted in a lower edge 20b of the airbag body 20.

Figure 10A:
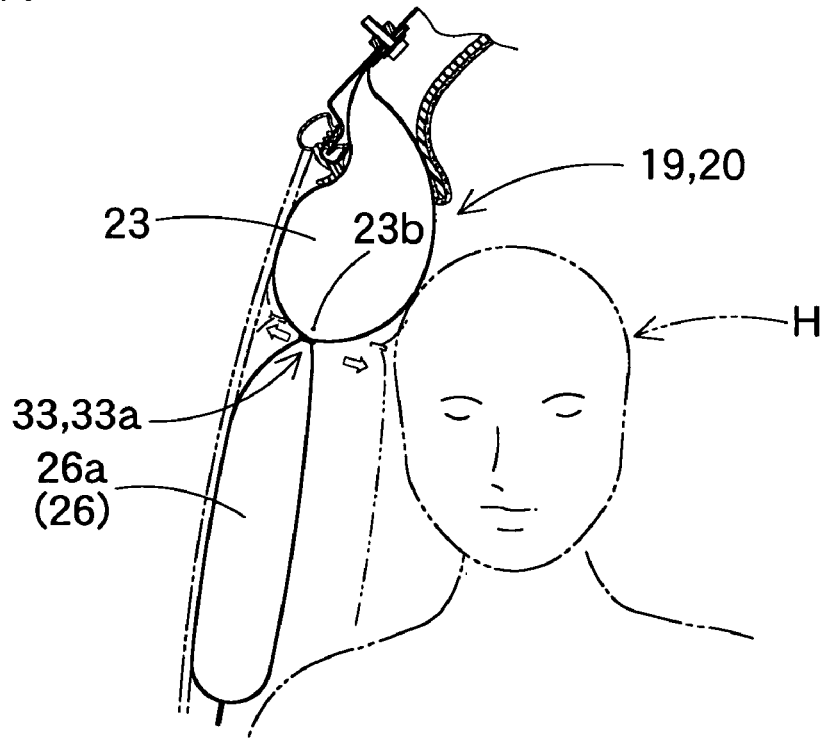
FIGS. 10A and 10B illustrate inflation process of the airbag, following the state in FIG. 9B.
Figure 10B:
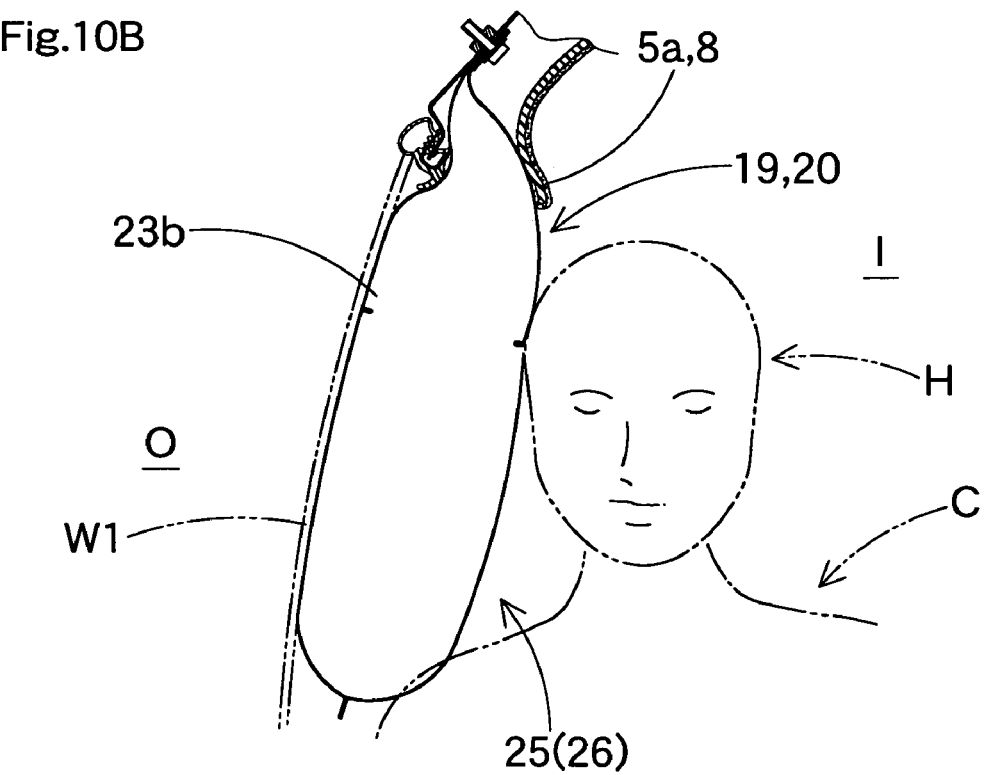
Figure 14A:
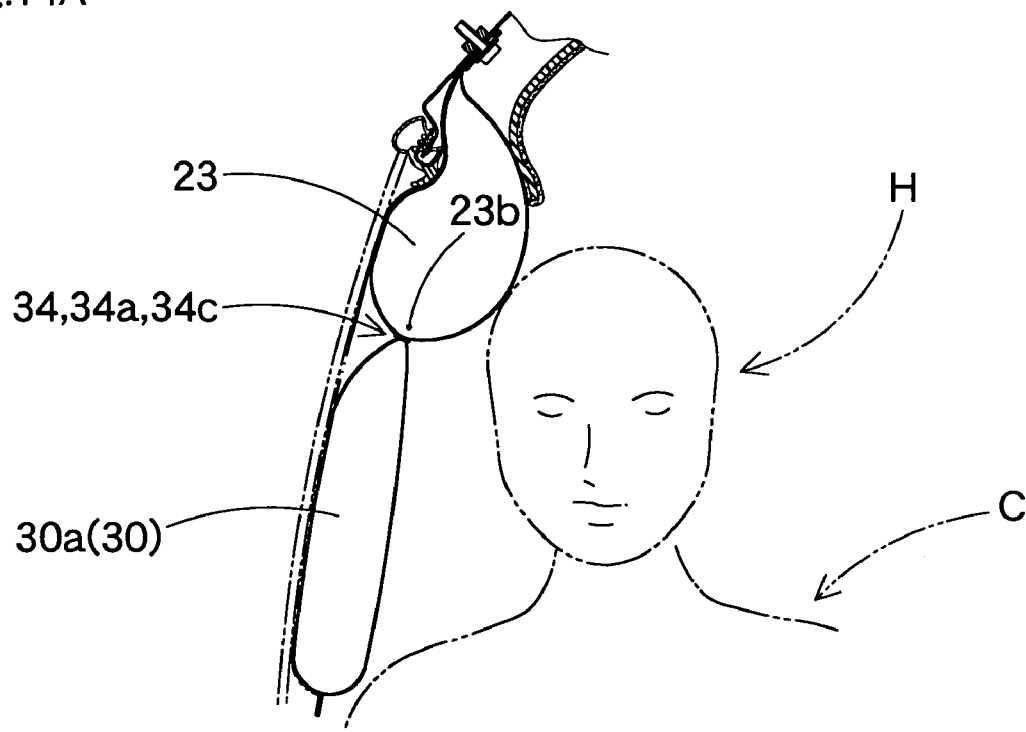
FIGS. 14A and 14B illustrate inflation process of the airbag, following the state in FIG. 13B.

The gas admissive portion 21 includes a joint port 22, a gas feed passage 23 and protective portions 25 and 29. The gas feed passage 23 is arranged straightly in the vehicle's front-rear direction along the upper edge 20a of the airbag body 20. In a substantially longitudinal center of the gas feed passage 23 is a joint port 22 extending upward for introducing inflation gas G from the inflator 12 into the gas admissive portion 21. The gas feed passage 23 supplies inflation gas G from the joint port 22 both frontward and rearward, i.e., to a part above the auxiliary cell 27A in the front side, and to a part above the main cell 30 in the rear side. The gas feed passage 23 is an initially inflatable portion that inflates firstly in the airbag body 20. When completely inflated after being mounted on the vehicle, a lower part 23b of the gas feed passage (or initially inflatable portion) 23 is arranged at a side of an upper part of an occupant's head H, while an upper part of the gas feed passage 23 is covered by the airbag cover 8, as shown in FIGS. 10 and 14.

The protective portions 25 and 29 are adapted to protect occupants' heads seated in the vehicle V together with the lower part 23b of the initially inflatable portion 23. The front protective portion 25 is arranged below a front part of the initially inflatable portion (gas feed passage) 23, and is located at a side of the front seat of the vehicle V to cover the side window W1 located at the side of the front seat upon deployment of the airbag body 20. The rear protective portion 29 is arranged below a rear part of the gas feed passage 23, and is located at a side of the rear seat of the vehicle V to cover the side window W2 located at the side of the rear seat upon airbag deployment. The protective portions 25 and 29 are partitioned by the partitioning portions 41 and 42 as thickness regulators into the vertical cells 26, 27 (27A, 27B and 27C), 30 and 31 lined up in the front-rear direction of the vehicle and inflatable upon airbag deployment.

Each of the main cells 26 and 30 of the protective portion 25/29 is provided with a temporary joint 33 or 34 that joins the vehicle's inner and outer wall 21a and 21b and separates the walls 21a and 21b when internal pressure of the protective portion 25/29 rises at complete inflation, such that the protective portion 25/29 inflates thinly before separation of the temporary joint 33/34, as shown in FIGS. 3B and 4B, and then inflates thickly after the separation as shown in FIGS. 3C and 4C. In the foregoing embodiment, the temporary joints 33 and 34 are formed by tearable stitching yarn 36 that stitches up the inner and outer walls 21a and 21b.

The temporary joint 33 includes a horizontal portion 33c located at an upper end part 33a, and two vertical portions 33d extending downward from the horizontal portion 33c. The horizontal portion 33c is located along the lower edge of the initially inflatable portion 23 to join upper ends of the partitioning portions 41 and 42 such that the initially inflatable portion 23 and the protective portion 25 are partitioned. Each of the vertical portions 33d extends straightly and vertically until the vicinity of the lower ends 41a and 42a of the partitioning portions 41 and 42, and ends in halfway of the area of the protective portion 25, such that stress is likely to be concentrated on a lower end 33b of the temporary joint 33 when the cell 26 is inflated. The vertical portions 33d are arranged separately from each other so as to divide a clearance between the partitioning portions 41 and 42 into three equal parts.

The temporary joint 34 has a substantially laid-down F shape, and includes a horizontal portion 34c joined with the upper end of the partitioning portion 41 in an upper end part 34a, and two vertical portions 34d in a lower end part 34b. The vertical portions 34d extend straightly and vertically until the vicinity of the lower end 41a of the partitioning portion 41, and end in halfway of the area of the protective portion 29, such that stress is likely to be concentrated on the lower end part 34b when the cell 30 is inflated. The vertical portions 34d are arranged separately from each other so as to divide the cell 30 into three equal parts.

The stitching yarn 36 is not torn immediately when the main cells 26 and 30 start to inflate. As shown in FIGS. 3A, 3B, 3C, 4A, 4B and 4C, breaking strength of the yarn 36 is predetermined such that the yarn 36 is broken when, after the main cells 26 and 30 complete inflation, small cells 26a and 30a in a thin state gain increased internal pressure. The small cells 26a and 30a are cells into which the main cells 26 and 30 are split in the front-rear direction by the vertical portions 33d and 34d of the temporary joints 33 and 34.

In the main cell 26, the horizontal portion 33c of the temporary joint 33 joining the vehicle's inner wall 21a and 21b is arranged in the upper end part of the main cell 26 to join the upper ends of the partitioning portions 41 and 42. Accordingly, as shown in FIGS. 5A, 5B and 5C, the main cell 26 admits inflation gas from portions below the partitioning portions 41 and 42 until the horizontal portion 33c is broken to separate the walls 21a and 21b. The portions below the partitioning portions 41 and 42 constitute gas inlet ports 26b and 26c, as shown in FIG. 2.

In the main cell 30, the horizontal portion 34c of the temporary joint 34 joining the vehicle's inner wall 21a and 21b is arranged in the upper end part of the main cell 30 and extends rearward from the upper end of the partitioning portion 41. Moreover, a rear end of the horizontal portion 34c is not connected with a rear edge of the peripheral portion 39. Accordingly, the main cell 30 admits inflation gas from a portion between the rear edge of the peripheral portion 39 and the rear end of the horizontal portion 34c as a gas inlet port 30b, as shown in FIG. 2, until the horizontal portion 34c is broken to separate the walls 21a and 21b.

Figure 14B:
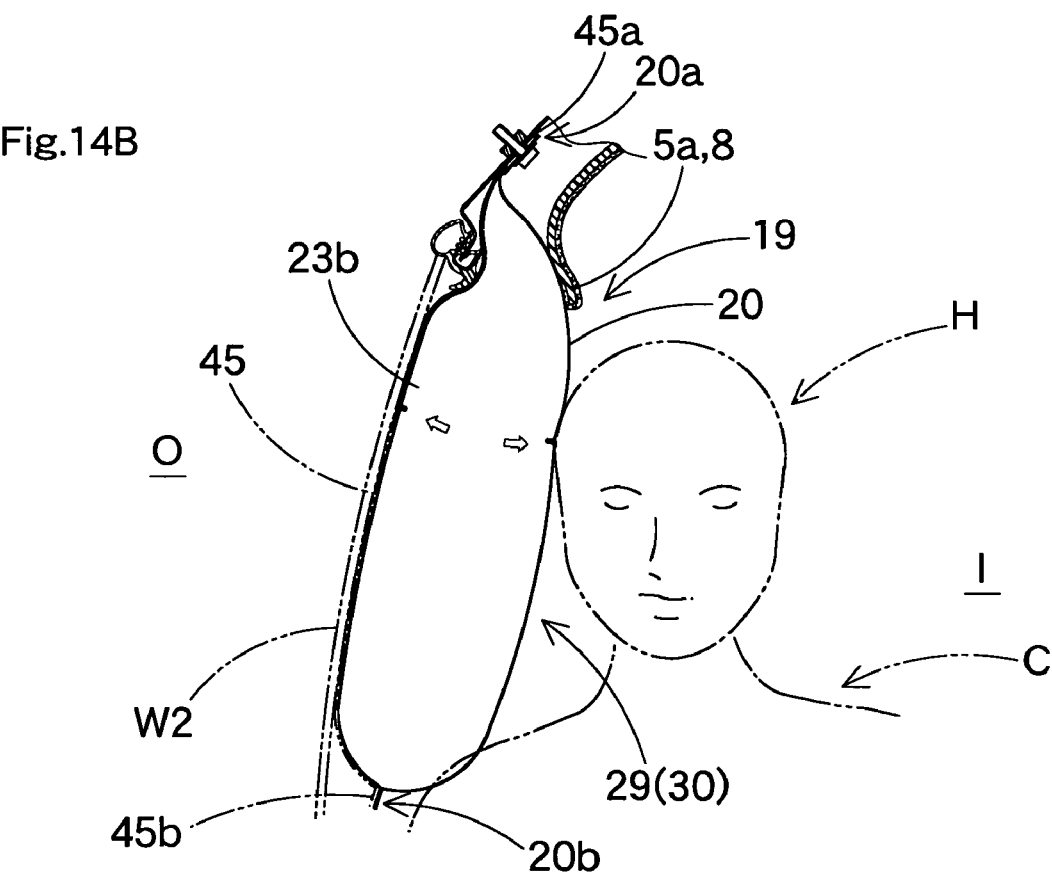

As shown in FIGS. 2 and 14B, the belt 45 is adapted to pull the lower edge 20b of the airbag body 20 toward the exterior of the vehicle during airbag deployment. An upper end 45a of the belt 45 is connected to an exterior side O of the airbag body 20 in the upper edge 20a, and a lower end 45b of the belt 45 is connected to the exterior side O of the airbag body 20 in the lower edge 20b. Especially in the illustrated embodiment; the upper end 45a is connected to a rearmost mounting portion 40B of the airbag body 20, and the lower end 45b is connected to the vicinity of the longitudinal center of the lower edge 20b of the airbag body 20, as shown in FIGS. 2 and 11. In the foregoing embodiment, the belt 45 is connected to the airbag body 20 by sewing work. Length of the belt 45 substantially equals the length between each of the connected positions as the airbag body 20 is flatly developed.

To mount the airbag 19 on the vehicle V, the airbag 19 having the belt 45 preliminarily connected thereto is firstly flatly developed with the vehicle's inner wall 21a and outer wall 21b overlaid on each other. Then the initially inflatable portion (or gas feed passage) 23 located along the upper edge 20a of the airbag body 20 is vertically bellows-folded on subsequent crest and valley folds D, as shown in FIGS. 2, 6A, 6B, 7 and 11, together with the belt 45, so that a folded and piled portion 47 is formed along the upper edge 20a.

As shown in FIG. 6C, subsequently, a part of the airbag body 20 below the folded and piled portion 47 is roll-folded toward the exterior O of the vehicle together with the belt 45 from the lower edge 20b of the airbag body 20, so tat a roll-folded portion 48 is formed, and the folding work of the airbag 19 is completed.

Thereafter, the folded airbag 19 is wrapped at predetermined positions with a not-shown breakable tape member for keeping the folded-up configuration. Then the inflator 12, the mounting brackets 10 and 13 are fixed thereto to form an airbag module.

By locating the individual mounting brackets 10 and 13 at predetermined positions of the inner panel 2, and fixing them to the inner panel 2 with bolts 11 and 14, the airbag module is mounted on the vehicle body 1. Subsequently, a not-shown lead wire extending from a predetermined control device for actuating the inflator is connected to the inflator 12. If the front pillar garnish 4, the roof head lining 5, and further the center pillar garnish 7 and the rear pillar garnish 6 are attached to the vehicle body 1, the airbag device M is mounted on the vehicle V.

At this time, with respect to a mounting state of the head-protecting airbag 19, a portion of the inner panel 2 where the mounting portions 40 arc attached is directed toward the exterior O of vehicle obliquely downward. Along with the slant, the roll-folded portion 48 is located toward the exterior O below the folded and piled portion 47.

When the inflator 12 is actuated after the airbag device M is mounted on the vehicle V, inflation gas G discharged from the inflator 12 flows into the gas feed passage (or initially inflatable portion) 23 via the joint port 22 and flows therein in front and rear directions, as indicated by double-dotted lines in FIG. 2. Then gas G enters each of the protective portions 25 and 29 of the airbag body 20, and the protective portions 25 and 29 unfold and start to inflate. The airbag body 20 then breaks the tape member, pushes and opens the airbag cover 8 in the lower edges 4a and 5a of the front pillar garnish 4 and the roof head lining 5, and inflates to cover the inner side I of side windows W1 and W2, the center pillar CP, and the rear pillar RP while protruding downward as indicated by double-dotted lines in FIG. 1.

Figure 12:
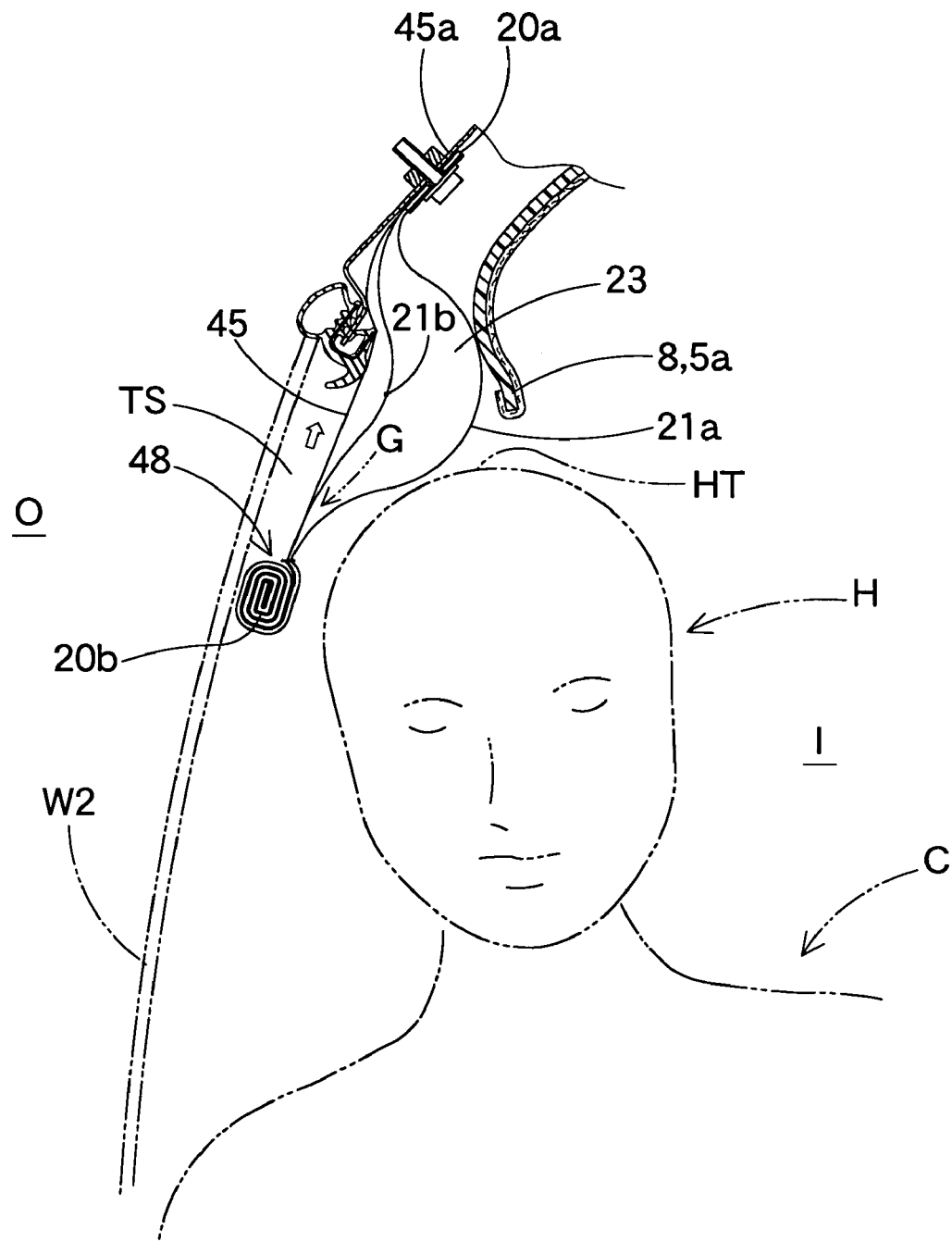
FIG. 12 illustrates an initial stage of inflation of the airbag of FIG. 2 in the vicinity of the main cell, taken along line XI-XI of FIG. 1.

In the head-protecting airbag 19, the initially inflatable portion (gas feed passage) 23 of the airbag body 20 located along the upper edge 20a is the folded and piled portion 47 which is so bellows-folded on folds D as to push out the protective portions 25 and 29 downward. Accordingly, as shown in FIGS. 8A, 8B, 11 and 12, when the initially inflatable portion 23 inflates, the folded and piled portion 47 fed with inflation gas immediately pushes out a portion below thereof, or a lower part of the airbag body 20 including the roll-folded portion 48 downward, i.e., obliquely downward and toward exterior O. Moreover, at this time, the belt 45 joining the upper edge 20a and lower edge 20b in exterior side O of the airbag body 20 regulates the lower edge 20b to develop outward O, as shown in FIG. 12. Consequently, the lower part of the airbag body 20 including the roll-folded portion 48 is pushed out along side windows W1 and W2 swiftly. Even if a head H of an occupant C is located close to side windows W1 and W2, accordingly, the lower edge 20b of the airbag body 20 cuts into a narrow triangular space TS between side windows W1 and W2 and an upper end HT of the occupant's head H from upper side. Especially, since the lower part of the airbag 19 is the roll-folded portion 48 which does not unfold as easily as the folded and piled portion 47, the lower edge 20b easily enters into the space TS while keeping thin and compact state.

Figure 9A:
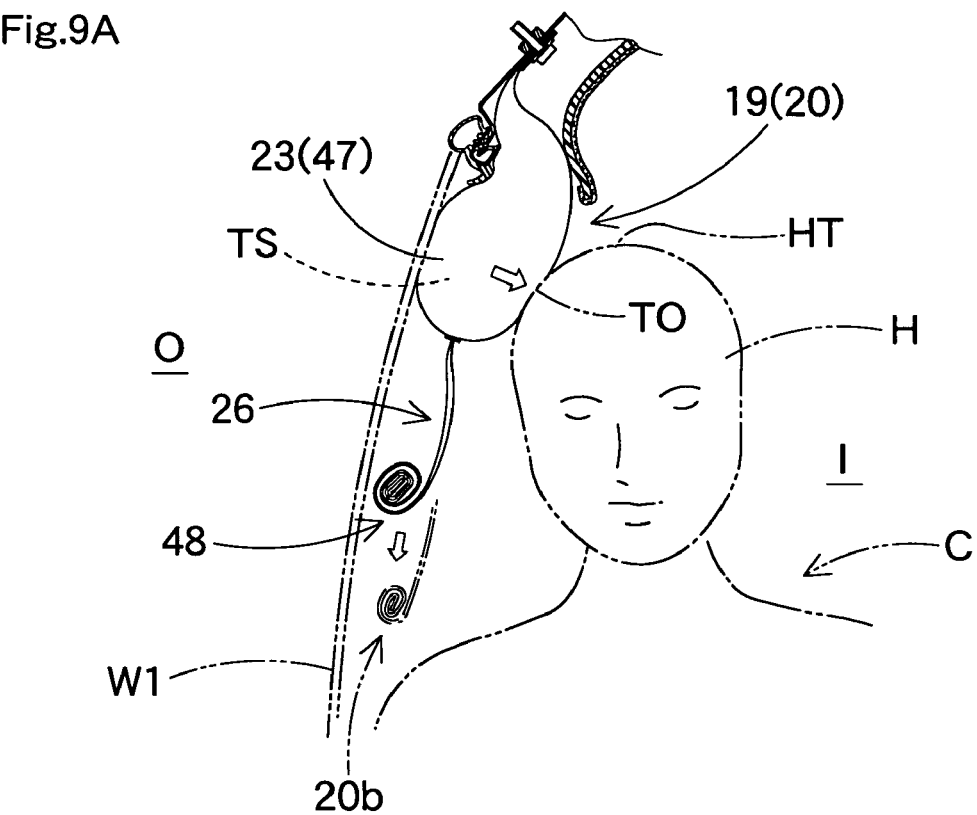
FIGS. 9A and 9B illustrate inflation process of the airbag, following the state in FIG. 8B.
Figure 13A:
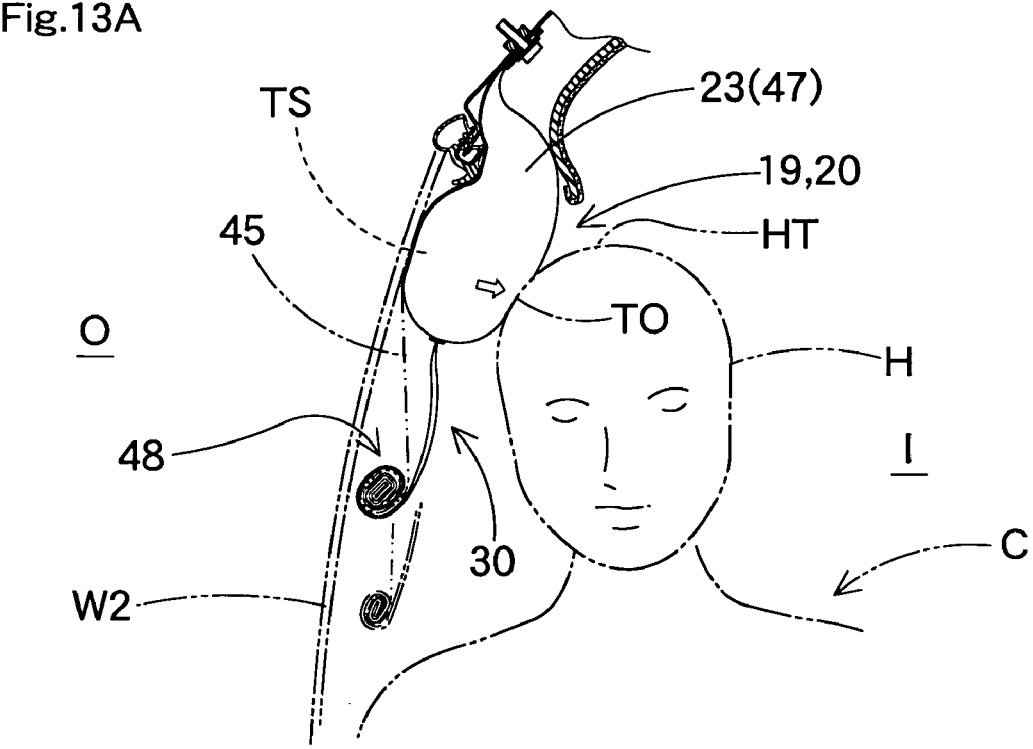
FIGS. 13A and 13B illustrate inflation process of the airbag, following the state in FIG. 12.

If the initially inflatable portion 23 further inflates from this state, the initially inflatable portion 23 pushes an exterior portion TO of the occupant's head H close to the upper end HT inward I of the vehicle, or toward transverse center of vehicle V, as shown in FIGS. 9A and 13A, thereby widens the triangular space TS. Then the lower edge part 20b of the airbag body 20 pushed out by the initially inflatable portion 23 cuts in the widened space TS between side windows W1 and W2 and the upper end HT of the occupant's head H.

Figure 9B:
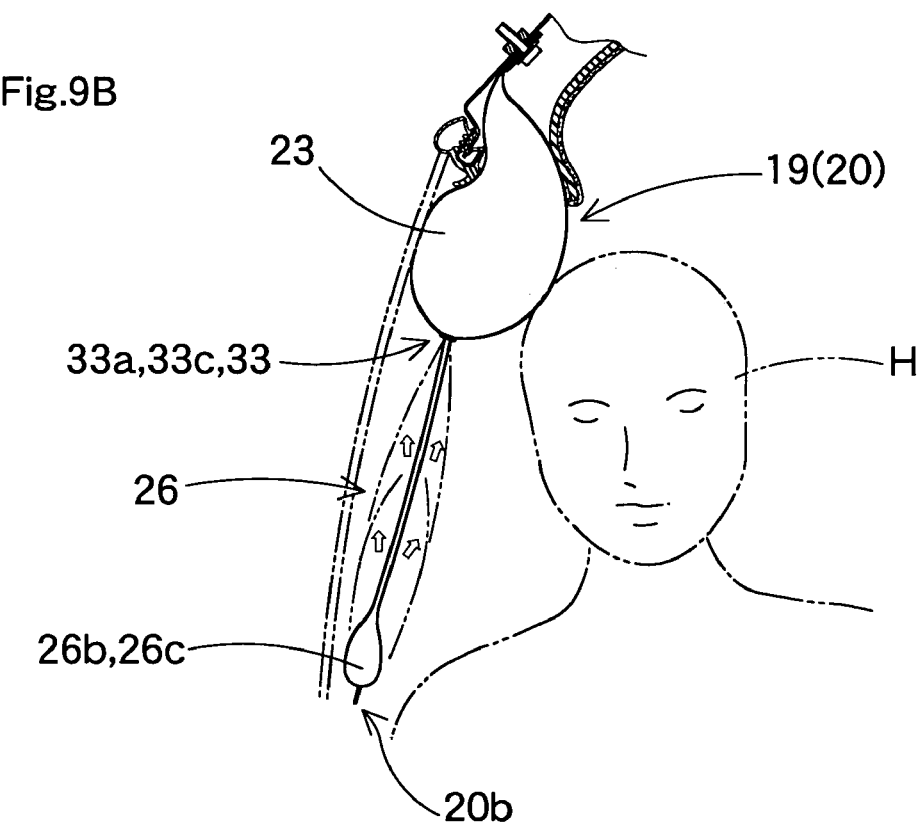
Figure 13B:
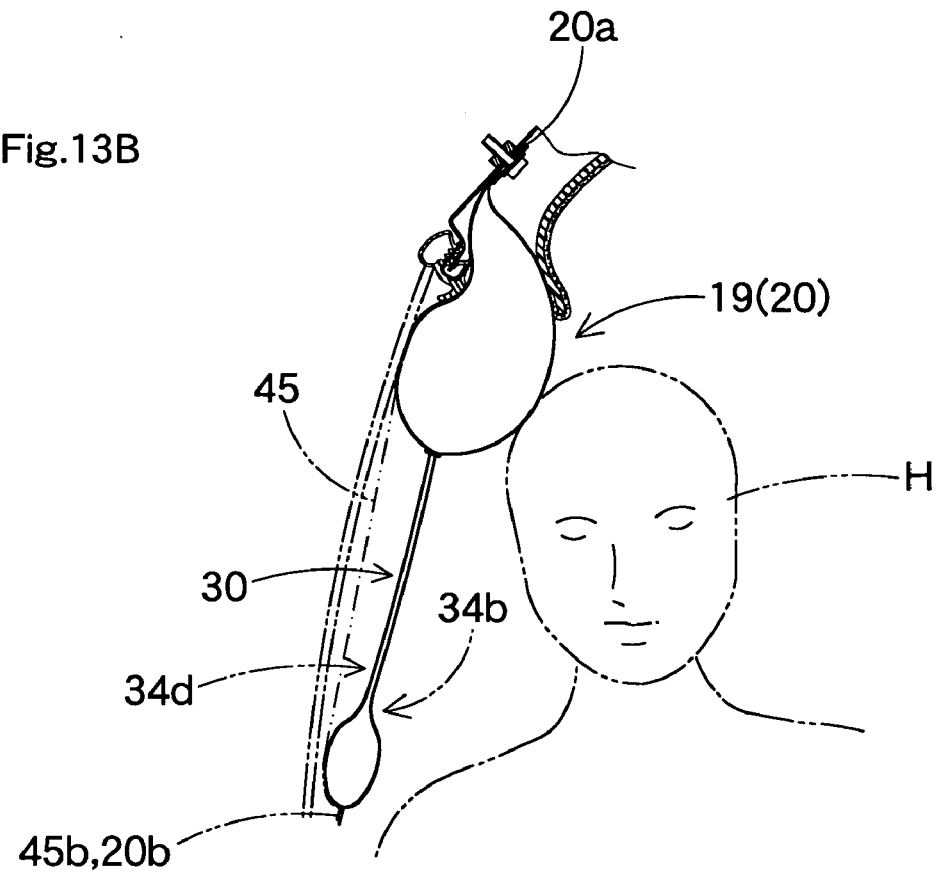

Then a lower part of the folded and piled portion 47 of the airbag 19 enters into the widened space TS, and the roll-folded portion 48 enters therein while unfolding, as shown in FIGS. 9B and 13B. Since the roll-folded portion 48 is roll-folded toward exterior O from the lower edge 20b of the airbag body 20, the portion 48 is guided by the occupant's head H when unrolled even if the portion 48 engages the head H. Consequently, the airbag body 20 smoothly unfolds and completes development up to an area below the occupant's head H. Regarding an unfolded portion of the roll-folded portion 48, since the portion 48 keeps a thin state, the portion 48 enters into the space TS smoothly and goes unfolded.

In the main cells 26 and 30 of the protective portions 25 and 29, at this time, since internal pressures are still low, the temporary joints 33 and 34 still keep the vehicle's inner wall 21a and outer wall 21b joined, as indicated by double-dotted lines in FIGS. 3A and 4A. Accordingly, the small cells 26a and 30a complete development in thin states, so that the main cells 26 and 30 deploy at side of occupants' heads H smoothly and stably by unrolling even if spaces between side windows W1 and W2 and the occupants' heads H are narrow.

After the protective portions 25 and 29 are completely developed, the temporary joints 33 and 34 separate the inner and outer walls 21a and 21b along with increase of internal pressures of the main cells 26 and 30. Then the main cells 26 and 30 inflate portions where the temporary joints 33 and 34 used to be, as shown in FIGS. 10 and 14, and protect the occupants' heads H with sufficient cushioning property or impact absorbing stroke, together with the lower part 23b of the initially inflatable portion 23.

Therefore, the head-protecting airbag 19 of the foregoing embodiment is capable of deploying in a clearance between side windows W1 and W2 and the occupants' heads H smoothly and stably even in case the clearance is narrow, and further protecting the heads H with sufficient cushioning property.

In the foregoing embodiment, moreover, the temporary joints 33 and 34 include the vertical portions 33d and 34d, which are arranged substantially vertically, such that the inner wall 21a and outer wall 21b are separated from the lower ends 33b and 34b.

As shown in FIGS. 5B and 9B, accordingly, the vehicle's inner wall 21a and 21b are separated by the temporary joints 33 and 34 from lower side to upper side of the main cells 26 and 30. That is, if the inner and outer walls 21a and 21b are constructed to be separated from the upper ends 33a and 34a of the temporary joints 33 and 34, upper parts of the main cells 26 and 30 start to bulge before completion of development since the head-protecting airbag 19 is constructed to develop downward from upper side of side windows W1 and W2, so that access of inflation gas G to lower parts of the main cells 26 and 30 is delayed, and quick development of the main cells 26 and 30 is hindered.

With the above arrangement, however, separation of the temporary joints 33 and 34 of the vehicle's inner wall 21a and outer wall 21b proceeds from lower side to upper side of the main cells 26 and 30, so that separation of the walls 21a and 21b starts in a condition that inflation gas G has reached the lower parts of the main cells 26 and 30. In other words, the main cells 26 and 30 have completed development before the separation starts, so that stable development of the main cells 26 and 30 are assured.

Especially, the main cell 26 of the front protective portion 25 includes the gas inlet ports 26b and 26c for introducing inflation gas G from lower side as completely inflated. In the front protective potion 25, accordingly, portions which are adjacent to the main cell 26 in front and rear and communicated with the gas inlet ports 26b and 26c, i.e., the auxiliary cells 27A and 27C (27B) complete development prior to the main cell 26, so that the main cell 26 completes development in further uninflated and thin state, as indicated by double-dotted lines in FIG. 3A. Therefore, even if a clearance between the occupant's head H and side window W1 is quite narrow, the main cell 26 deploys easily in the clearance.

Here, when a test was conducted employing the foregoing embodiment of the airbag, the airbag could develop and inflate between side window W1 and occupant's head H smoothly even when the head H is in contact with side window W1.

On the other hand, since the main cell 30 of the rear protective portion 29 includes the gas inlet port 30b in upper part, a small cell 30ac provided between the rearmost vertical portion 34d and rear edge of the peripheral portion 39 below the gas inlet port 30b admits inflation gas and inflates to a certain extent, as indicated by double-dotted lines in FIG. 4A. In this case, even if the occupant's head H approaches when the main cell 30 has just been developed, the head H is protected by the auxiliary cell 31 and the small cell 30ac.

When the main cell includes a gas inlet port in its lower part, the inlet port does not necessarily have to be located in both front and rear, as in the foregoing embodiment, but only one inlet port may be located at either one of the front and rear. However, if the inlet ports 26b and 26c are located in both front and rear side, the main cell 26 is inflated swiftly.

Figure 15:
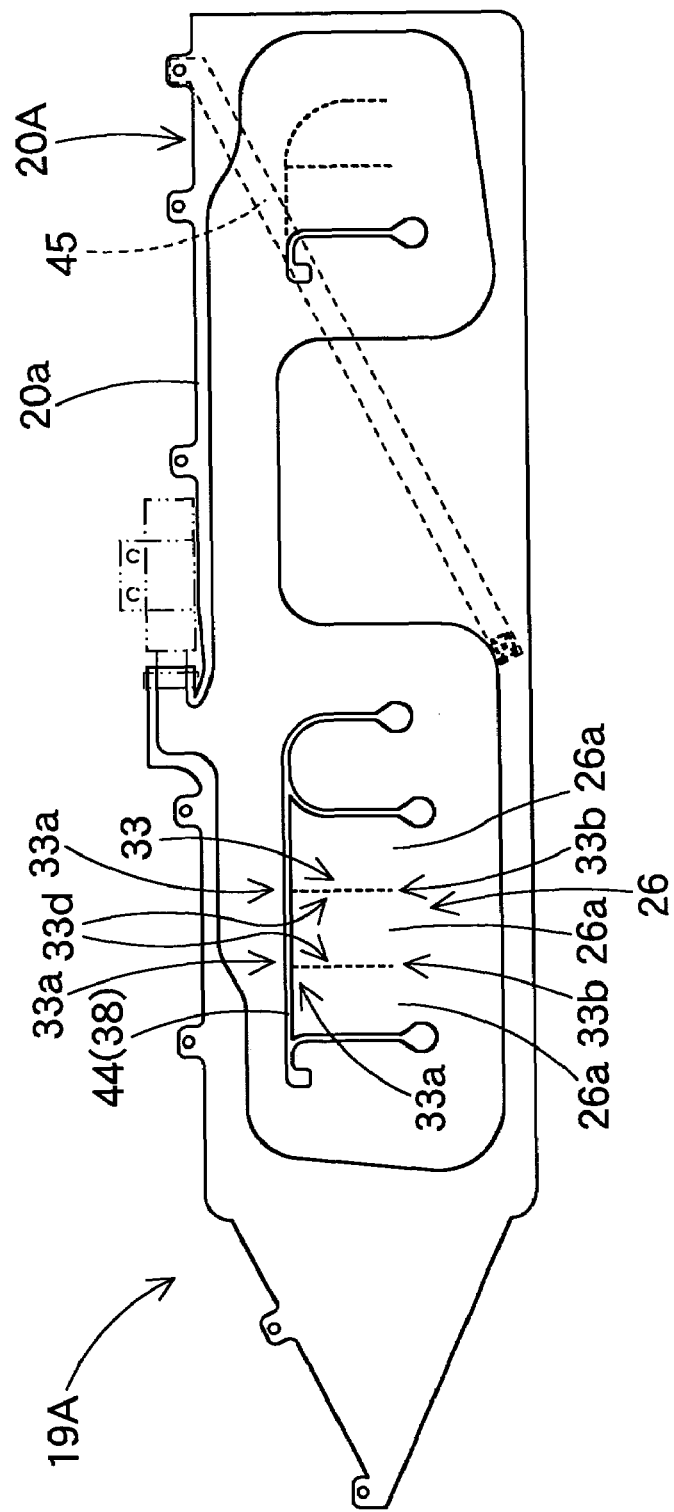
FIG. 15 is a front view of other embodiment of the airbag.

When the main cell is provided at lower part with a gas inlet port, it will also be appreciated to adopt an arrangement of an airbag 19A shown in FIG. 15. An airbag body 20A of the airbag 19A includes a partitioning portion 44 for partitioning the initially inflatable portion 23 and the main cell 26 by joining upper ends of the partitioning portions 41 and 42, instead of the horizontal portion 33c of the temporary joint 33. The partitioning portion 44 is part of non-admissive portion 38 which is not tearable, and upper ends 33a of the vertical portions 33d are connected with the partitioning portion 44. In comparison with this, the airbag 19 does not include a partitioning portion 44 for partitioning the initially inflatable portion 23 and the main cell 26, but instead locates the upper end portion 33a of the temporary joint 33 to adjoin the initially inflatable portion 23. Accordingly, the horizontal portion 33c separates the inner wall 21a and outer wall 21b in the upper end part 33a upon airbag inflation, so that the main cell 26 and the initially inflatable portion 23 complete inflation in a communicated state. Therefore, as shown in FIG. 5C, the main cell 26 inflates thickly with increased cushioning property together with the gas feed passage (initially inflatable portion) 23.

In the airbag body 20, moreover, an entire area of the initially inflatable portion 23 is the folded and piled portion 47 that the inner wall 21a and outer wall 21b are so folded and piled together on folds D as to push out the protective portions 25 and 29 downward when inflated with inflation gas G, while an entire area below the initially inflatable portion 23 is the roll-folded portion 48 rolled toward exterior O from the lower edge 20c. The airbag body 20 is housed in upper side of side windows W1 and W2 in this state.

With this arrangement, since the initially inflatable portion 23 is folded in a manner which is more unfoldable than the roll-folded portion 48, the entire portion 23 develops and inflates swiftly in the initial stage of deployment. Accordingly, the portion 23 helps push out the roll-folded portion 48 downward and along side windows W1 and W2 in cooperation with regulation of the belt 45 toward exterior O, so that a heavy occupant's head H is pushed toward interior I quickly even if the head H of occupant C of large build is proximate to side windows W1 and W2, and a lower part of the airbag body 20 including the roll-folded portion 48 enters into a clearance between the head H and side windows W1 and W2.

Figure 16:
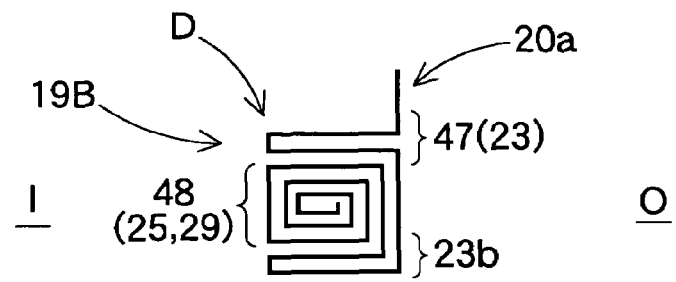
FIG. 16 is a schematic section illustrating other folding method of an airbag.

It is sufficient that the folded and piled portion 47 is constructed so as to push out the roll-folded portion 48 in cooperation with the belt 45. Accordingly, the folded and piled portion 47 may be constructed as an airbag 19B shown in FIG. 16, where only a part of the initially inflatable portion 23 located along the upper edge of the airbag body 20 is vertically bellows-folded from a state in which the walls 21a and 21b are overlaid on each other, and a remaining portion 23b below the folded and piled portion 47 is located to encircle the roll-folded portion 48 from exterior side to lower side.

Figure 17:
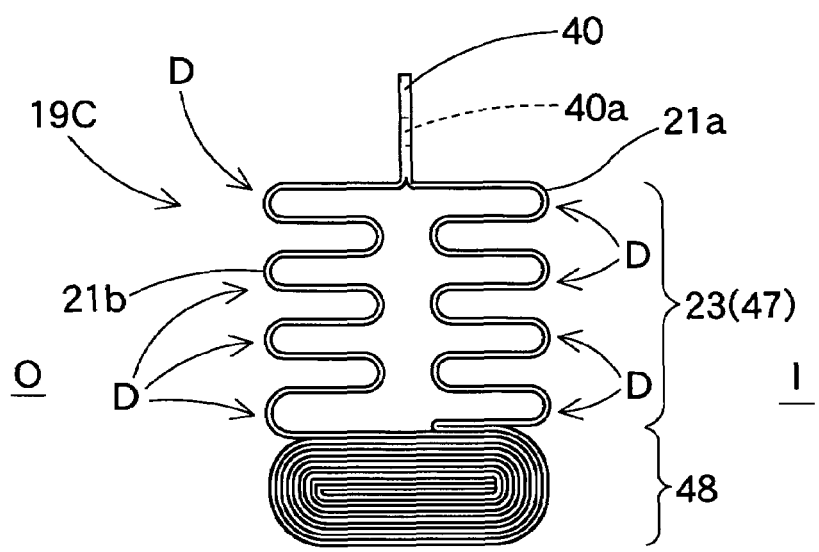
FIG. 17 is a schematic section illustrating another folding method of an airbag.
Figure 18:
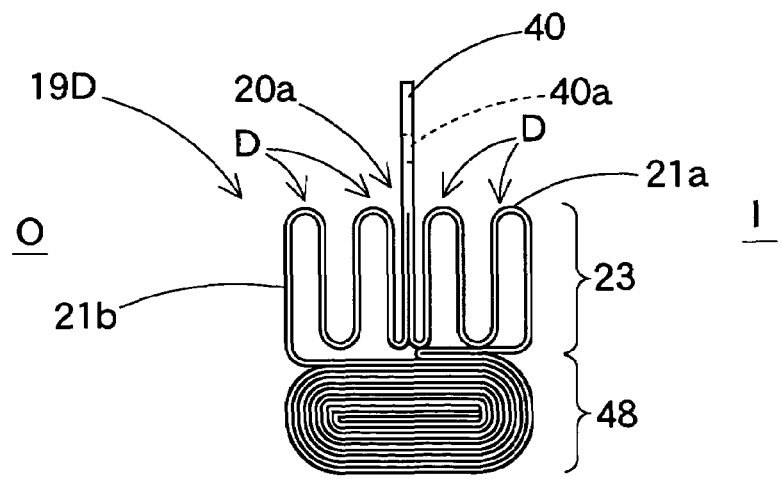
FIG. 18 is a schematic section illustrating still another folding method of an airbag.

Moreover, since it is sufficient that the folded and piled portion 47 is swiftly developed when fed with inflation gas to push out the roll-folded portion 48, its folding method should not be limited to bellows-folding in which overlapped vehicle's inner wall 21a and outer wall 21b are folded together. As an airbag 19C shown in FIG. 17, for example, each of walls 21a and 21b may be folded and piled vertically in zigzag fashion on folds D. Alternatively, as an airbag 19D shown in FIG. 18, the portion 47 may be formed by cactus folding, i.e., each of walls 21a and 21b is folded and piled on folds D in exterior-interior direction such that an upper edge 20a is put in the initially inflatable portion 23.

Figure 19:
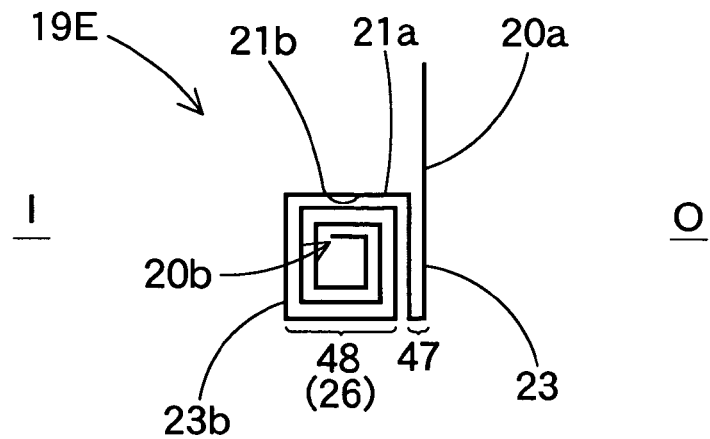
FIG. 19 is a schematic section illustrating yet another folding method of an airbag.

Furthermore, the folded and piled portion 47 is able to push out the roll-folded portion 48 along side windows W1 and W2 in cooperation with the belt 45, as long as the roll-folded portion 48 is located below the folded and piled portion 47. Accordingly, it will also be appreciated to adopt a construction of an airbag 19E shown in FIGS. 19 and 20. A roll-folded portion 48 of the airbag 19E is located at side of the folded and piled portion 47 along a direction of bellows-folding, in folding process. When mounted on vehicle, as shown in FIG. 20, the folded airbag 19E is mounted along a slant of inner panel 2 such that the roll-folded portion 48 is located obliquely below and inward I of the folded and piled portion 47.

Figure 20:
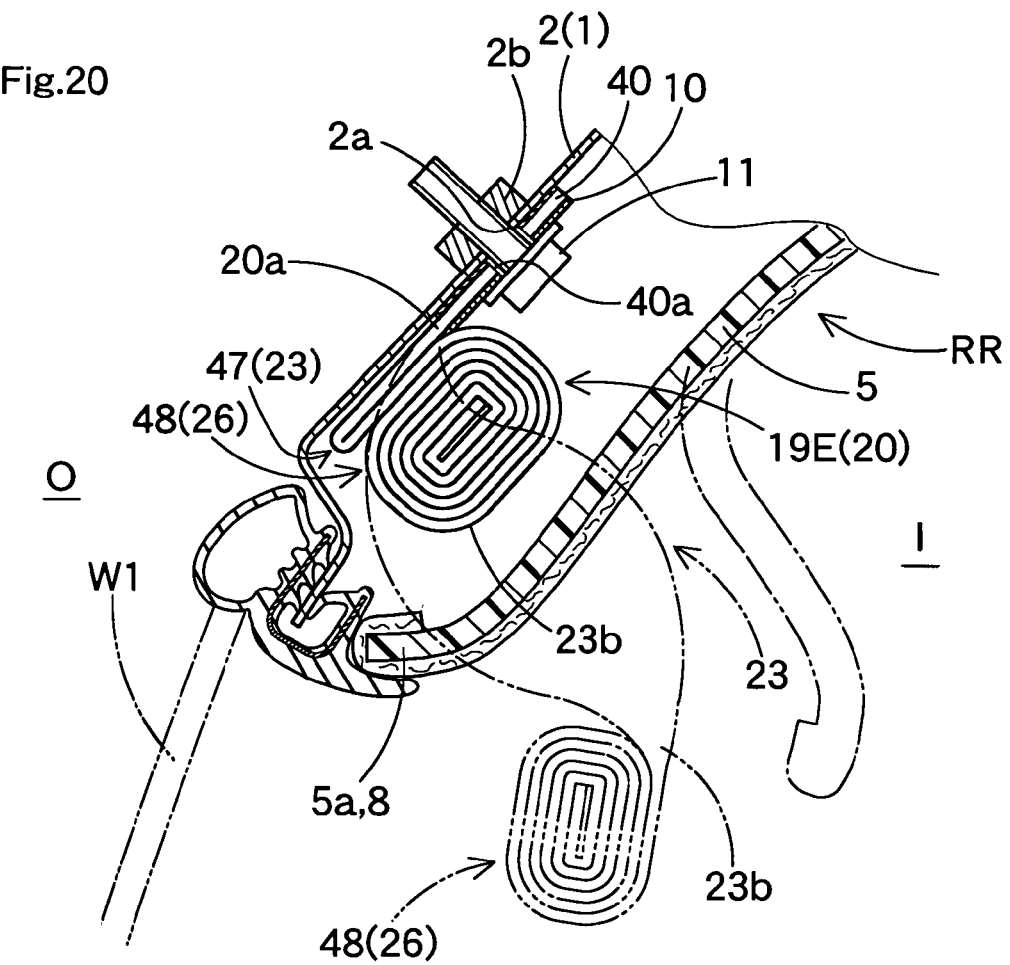
FIG. 20 is a schematic section of the airbag of FIG. 19 as mounted on a vehicle.
Figure 21A:
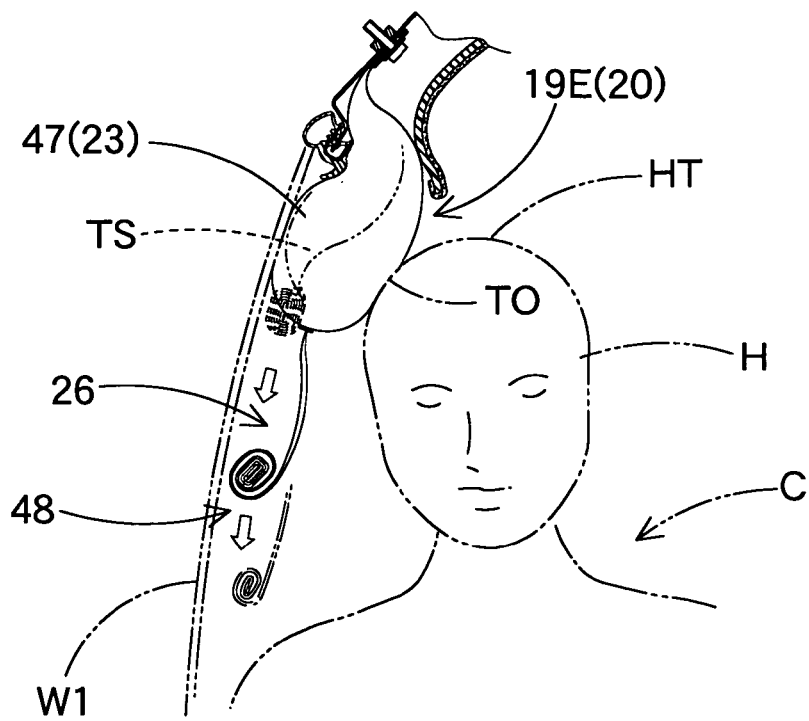
FIGS. 21A and 21B are schematic sections illustrating inflation process of the airbag of FIG. 19 in order.
Figure 21B:
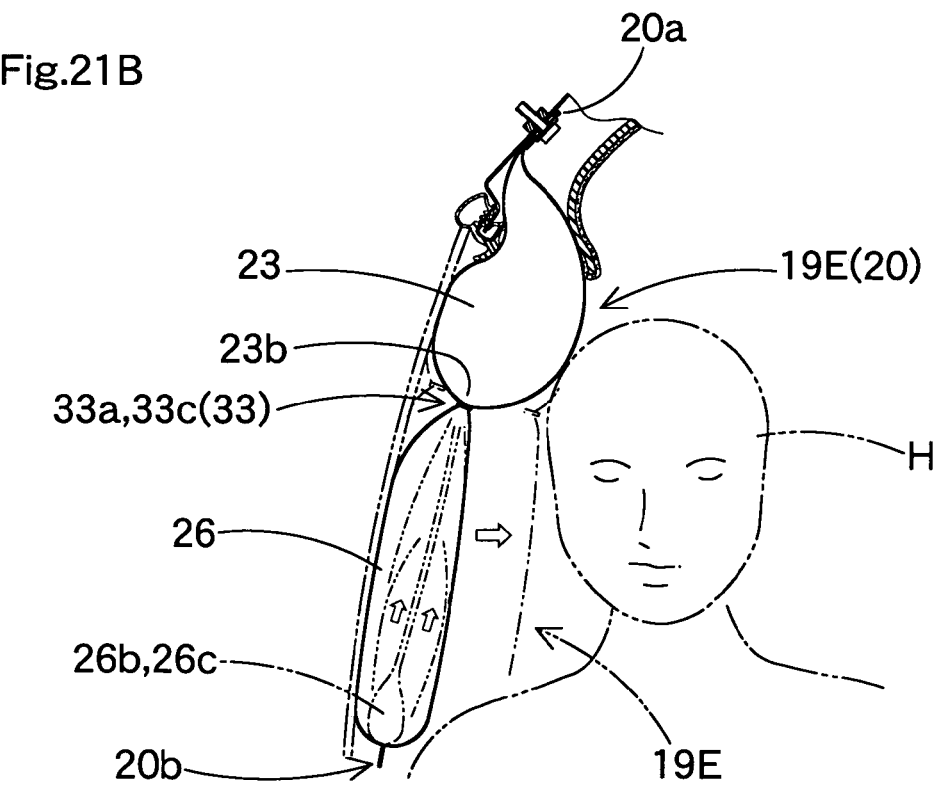

In this case, too, upon deployment, the folded and piled portion 47 pushes a portion below thereof or a lower part of the airbag body 20 including the roll-folded portion 48 downward (obliquely downward and inward I) along with inflation thereof, as shown in FIGS. 20, 21A and 21B. Then the lower part of the airbag body 20 including the roll-folded portion 48 is swiftly pushed along side windows W1 and W2 by the portion 47 and regulation by the belt 45. Accordingly, even if a head H of occupant C is located proximate to side windows W1 and W2, a lower edge 20b of the airbag body 20 cuts in a narrow triangular space TS between side windows W1 and W2 and upper end HT of the head H from upper side, and then advances in the space TS smoothly while unfolding, and inflates thickly to protect the head H properly. In the illustrated embodiment, the initially inflatable portion 23 encircles an upper part of the roll-folded portion 48 with its lower part 23b, so that the roll-folded portion 48 is pushed out downward even more swiftly.

In the airbag 19, the upper end 45a of the belt 45 is connected to a rear end of the airbag body 20 while the lower end 45b is connected to the vicinity of longitudinal center of the lower edge 20b of the airbag body 20.

With this arrangement, when the airbag body 20 is completely developed, the belt 45 pulls the vicinity of the longitudinal center of the lower edge 20b of the airbag body 20 toward a rear end of the airbag body 20. Since a front end of the airbag body 20 is attached to a lower part of the front pillar FP by a mounting portion 40F, and a tension along the front-rear direction is thus exerted in the lower edge 20b of the airbag body 20, the protective portion 25 is smoothly developed even if the lower edge 20b of the protective portion 25 gets caught by the head H slightly and is impeded in development right before completion of development, because the lower edge 20b is pulled because of the tension.

Figure 22:
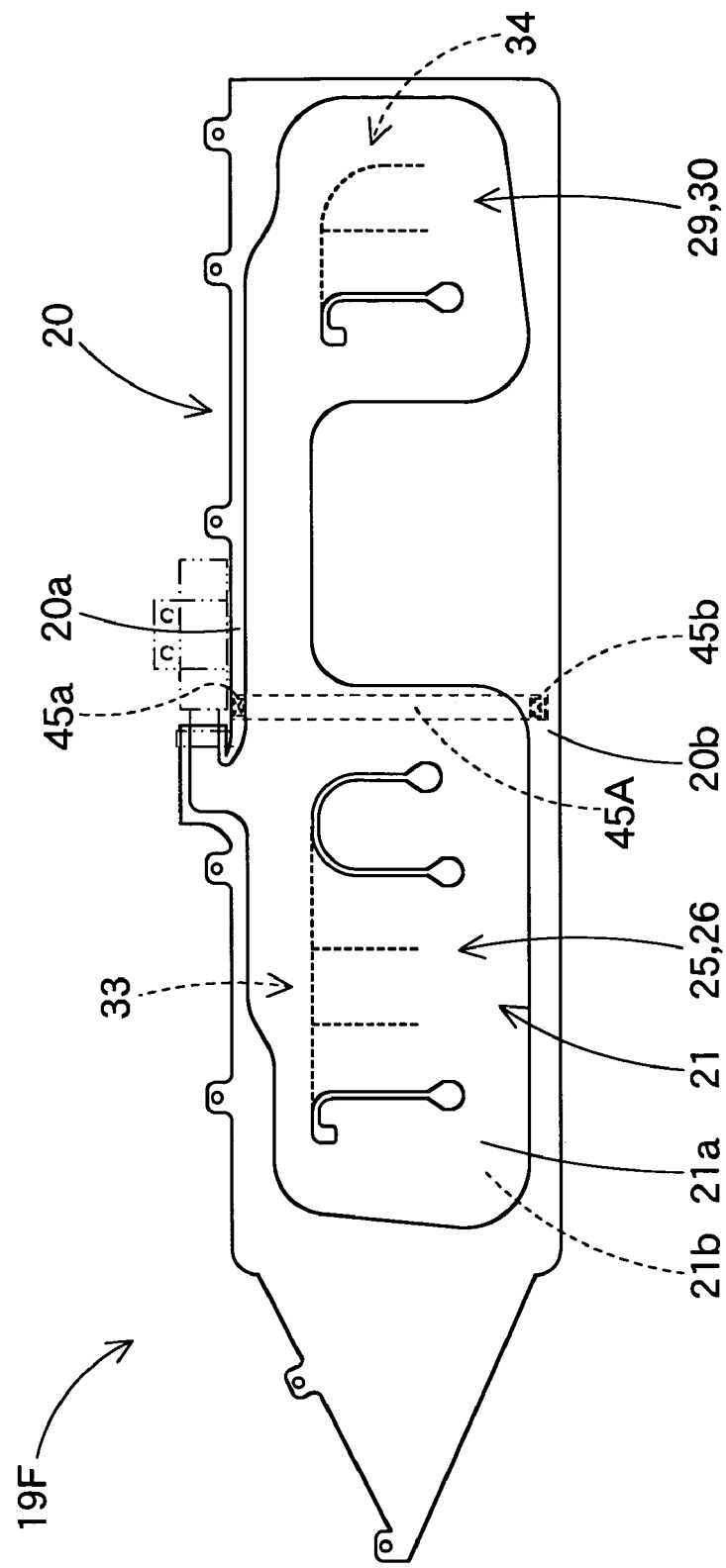
FIG. 22 is a front view of another embodiment of the airbag.
Figure 23:
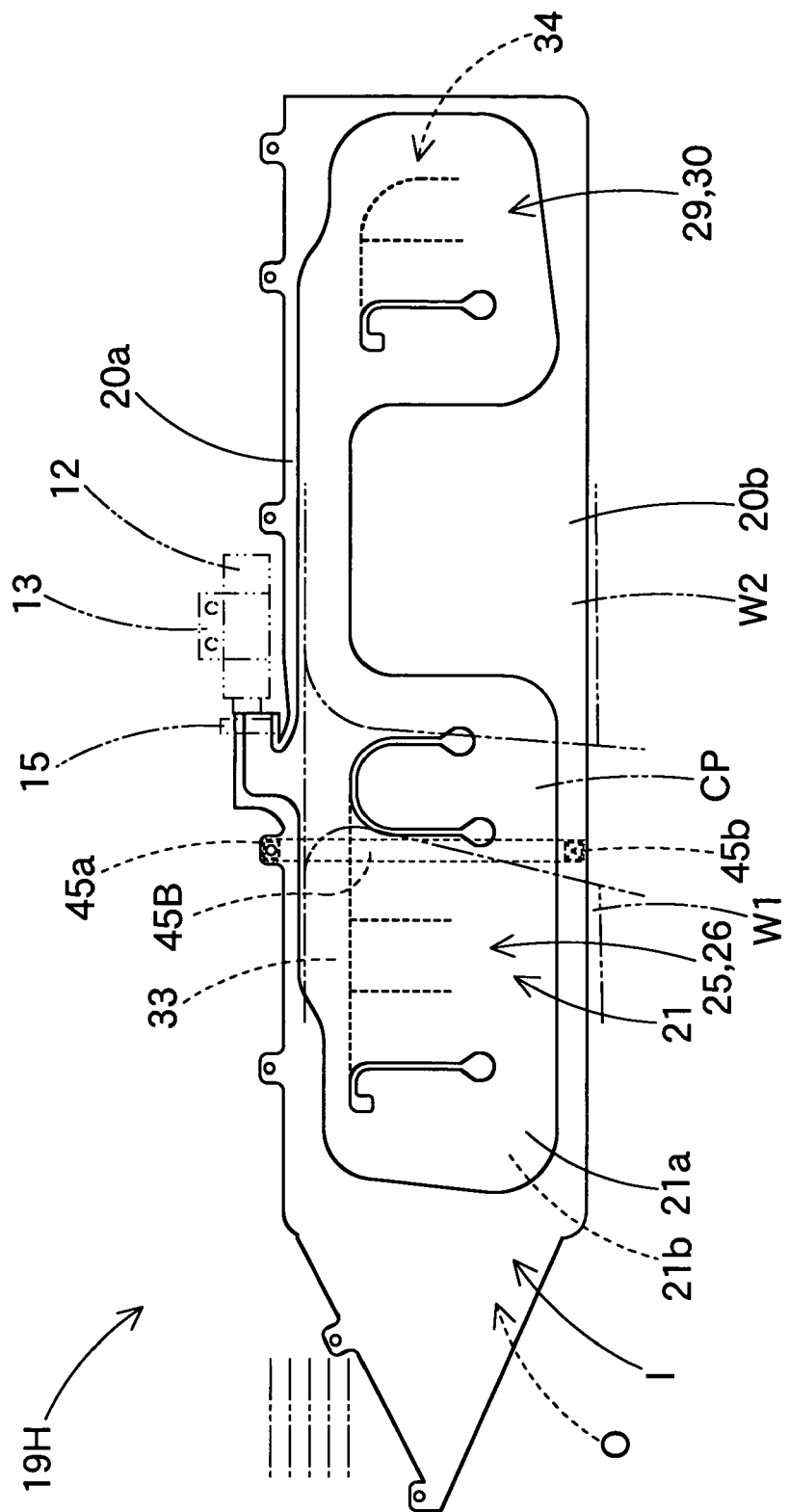
FIG. 23 is a front view of still another embodiment of the airbag.

Without considering above working-effects, constructions of airbags 19F and 19G shown in FIGS. 22 and 23 may also be adopted. In the airbags 19F and 19G, upper ends 45a and lower ends 45b of belts 45A and 45B are connected to upper edges 20a and lower edges 20b, respectively, of the airbag bodies 20 flatly developed with the vehicle's inner walls 21a and outer walls 21b overlapped with each other such that the belts 45A and 45B connect the upper and lower ends 20a and 20b along vertical direction. With these constructions, too, the belts 45A and 45B pull the lower edges 20b of the airbag bodies 20 outward of vehicle in the initial stage of development.

Moreover, when an airbag body 20 is adapted to cover interior side I of a plurality of side windows W1 and W2 and a pillar CP between the side windows W1 and W2 upon deployment, locations of the upper and lower ends 45a and 45B of the belt 45B may be adjusted such that the belt 45B is in the vicinity of, or adjacent to the pillar CP, as the airbag 19G shown in FIG. 23. Alternatively, the belt may overlap with the pillar CP partially, or entirely.

With this construction, even if a clearance between the pillar CP and occupant C is narrow because of protrusion of the pillar CP than the side windows W1 and W2, regulation by the belt 45B toward exterior O helps the airbag body 20 to develop downward along the pillar CP, so that the occupant C approaching the pillar CP is protected properly.

When a belt is arranged vertically as the belts 45A and 45B of the airbags 19F and 19G, length of material of the belt can be shortened. However, the belts 45A and 45B are piled and become bulky when the airbags 19F and 19G are folded to bring the upper edge 20a close to the lower edge 20a. Contrarily, in the airbag 19, although more material may be required, less parts of the belt 45 are piled when folded, so that the belt 45 does not become bulky, and is preferable when the airbag 19 is housed in a narrow space.

Although the lower end 45b of the belt 45 has to be connected to a location near the lower edge 20b of the airbag body 20 which is below the upper edge 20a where the upper end 45a of the belt 45 is connected, it is sufficient that the lower edge 20b is directed toward exterior O in the initial stage of inflation of the initially inflatable portion 23. Accordingly, the lower end 45b has only to be connected to a part of the airbag body 20 below the initially inflatable portion 23. For example, the lower end 45b may be connected to upper part of the panel portion 43 immediately below the initially inflatable portion 23. In addition, the upper end 45a of the belt 45 may be connected not only to the airbag body 20 itself, but also to part of vehicle body 1, such as inner panel 2 separated from the airbag body 20, on condition that the position is around the upper edge 20a of the airbag body 20. For example, as shown in FIG. 11, the upper end 45a of the belt 45 may be attached to inner panel 2 by bolt 11, not to the airbag body 20.

Although the temporary joints 33 and 34 in the main cells 26 and 30 of the airbag body 20 are formed by stitching up the vehicle's inner wall 21a and outer wall 21b by tearable stitching yarn 36, the construction of the temporary joints should not be limited thereby. For example, the temporary joint may be formed by adhering the walls 21a and 21b with releasable adhesive so that the walls 21a and 21b are separated upon release of adhesive. Moreover, when the airbag is formed by hollow-weaving method, the temporary joint may be formed by weaving part of yarns weaving either one of the inner wall 21a or outer wall 21b into the other wall such that the walls 21a and 21b are separated upon breaking of the yarns woven into the other wall.

Of course, if the temporary joint is formed by stitching yarn or adhesive, the airbag body may be manufactured by stitching work. Moreover, if the airbag body is manufactured by stitching work or hollow-weaving method or the like, coating may be applied to the airbag body for preventing gas leakage.

In the airbag bodies 20 and 20A, the inflator 12 is located at longitudinal central portion of the airbag bodies. However, it will also be appreciated that a joint port 22 for receiving the inflator is located at least one of front or rear end of the airbag body such that inflation gas is introduced into the airbag body from at least one longitudinal end of the airbag body. In this case, if the airbag body is elongated in front-rear direction, one or more joint ports for inflators may be located in middle positions in front-rear direction.

Tables 1, 2 and 3 shows results of various tests conducted on an airbag's having a temporary joint or not, folding method of the airbag, and the airbag's having a belt or not.

TABLE 1

|  |  | Combo1 | Combo2 | Combo3 | Combo4 | Combo5 | Combo6 | Combo7 | Combo8 | Combo9 | Combo10 | Combo11 | Combo12 |
|---|---|---|---|---|---|---|---|---|---|---|---|---|---|
| Bag | Non-tearable | ● | ● | ● | ● | ● | ● | ● | ● | ● | ● | ● | ● |
|  | Tearable ① |  |  |  |  |  |  |  |  |  |  |  |  |
|  | Tearable ② |  |  |  |  |  |  |  |  |  |  |  |  |
| Folding type | Type I | ● | ● | ● |  |  |  |  |  |  |  |  |  |
|  | Type II |  |  |  | ● | ● | ● |  |  |  |  |  |  |
|  | Type III |  |  |  |  |  |  | ● | ● | ● |  |  |  |
|  | Type IV |  |  |  |  |  |  |  |  |  | ● | ● | ● |
| Belt | None | ● |  |  | ● |  |  | ● |  |  | ● |  |  |
|  | Vertical |  | ● |  |  | ● |  |  | ● |  |  | ● |  |
|  | Oblique |  |  | ● |  |  | ● |  |  | ● |  |  | ● |
| Result(at 25 mm clearance) |  | X | X | X | X | Δ | Δ | X | Δ | Δ | X | Δ | Δ |

TABLE 2

|  |  | Combo13 | Combo14 | Combo15 | Combo16 | Combo17 | Combo18 | Combo19 | Combo20 | Combo21 | Combo22 | Combo23 | Combo24 |
|---|---|---|---|---|---|---|---|---|---|---|---|---|---|
| Bag | Non-tearable |  |  |  |  |  |  |  |  |  |  |  |  |
|  | Tearable ① | ● | ● | ● | ● | ● | ● | ● | ● | ● | ● | ● | ● |
|  | Tearable ② |  |  |  |  |  |  |  |  |  |  |  |  |
| Folding type | Type I | ● | ● | ● |  |  |  |  |  |  |  |  |  |
|  | Type II |  |  |  | ● | ● | ● |  |  |  |  |  |  |
|  | Type III |  |  |  |  |  |  | ● | ● | ● |  |  |  |
|  | Type IV |  |  |  |  |  |  |  |  |  | ● | ● | ● |
| Belt | None | ● |  |  | ● |  |  | ● |  |  | ● |  |  |
|  | Vertical |  | ● |  |  | ● |  |  | ● |  |  | ● |  |
|  | Oblique |  |  | ● |  |  | ● |  |  | ● |  |  | ● |
| Result(at 25 mm clearance) |  | X | X | X | X | ○ | ○ | X | ○ | ○ | X | ○ | ○ |

TABLE 3

|  |  | Combo25 | Combo26 | Combo27 | Combo28 | Combo29 | Combo30 | Combo31 | Combo32 | Combo33 | Combo34 | Combo35 | Combo36 |
|---|---|---|---|---|---|---|---|---|---|---|---|---|---|
| Bag | Non-tearable |  |  |  |  |  |  |  |  |  |  |  |  |
|  | Tearable ① |  |  |  |  |  |  |  |  |  |  |  |  |
|  | Tearable ② | ● | ● | ● | ● | ● | ● | ● | ● | ● | ● | ● | ● |
| Folding type | Type I | ● | ● | ● |  |  |  |  |  |  |  |  |  |
|  | Type II |  |  |  | ● | ● | ● |  |  |  |  |  |  |
|  | Type III |  |  |  |  |  |  | ● | ● | ● |  |  |  |
|  | Type IV |  |  |  |  |  |  |  |  |  | ● | ● | ● |
| Belt | None | ● |  |  | ● |  |  | ● |  |  | ● |  |  |
|  | Vertical |  | ● |  |  | ● |  |  | ● |  |  | ● |  |
|  | Oblique |  |  | ● |  |  | ● |  |  | ● |  |  | ● |
| Result(at 25 mm clearance) |  | X | X | X | X | ○ | ○ | X | ○ | ○ | X | ○ | ○ |

Figure 24:
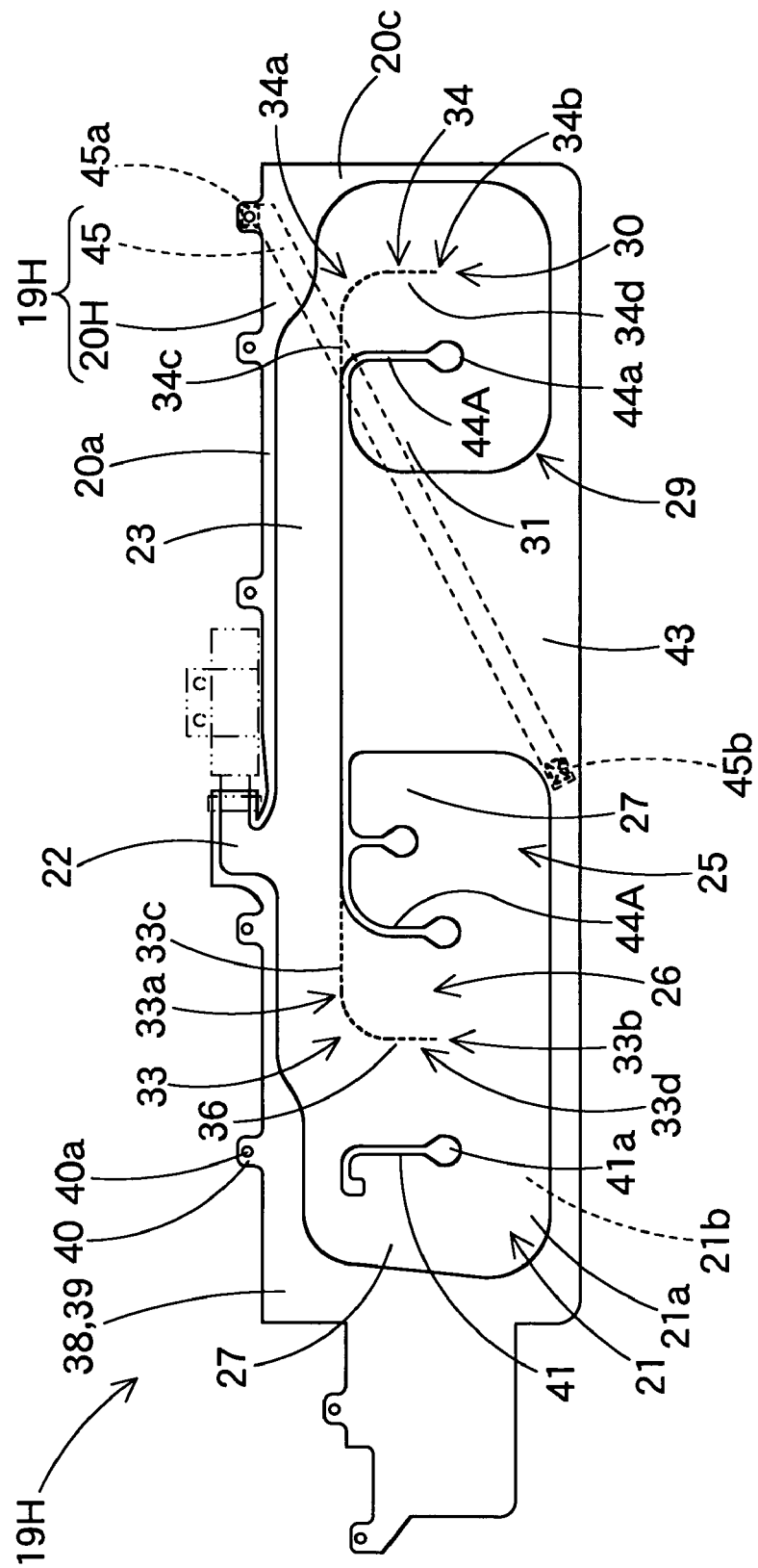
FIG. 24 is a front view of yet another embodiment of the airbag.

"Bag" line in each table shows kinds of airbag body. "Tearable 2" shows the airbag body 20 shown in FIG. 2, "Tearable 1" shows an airbag body 20H shown in FIG. 24, and "Non-tearable" shows an airbag body which has the same construction as the airbag body 20H but has no temporary joints 33/34.

The airbag body 20H is formed by hollow-weaving method, and includes generally L-shaped temporary joints 33 and 34 formed by stitching up the vehicle's inner wall 21a and outer wall 21b of a gas admissive portion 21 by stitching yarn 36. The temporary joint 33 is arranged within a main cell 26 located between front and rear auxiliary cells 27 in a front protective portion 25. The temporary joint 33 includes a horizontal portion 33c in upper end part 33a, and a vertical portion 33d extending straightly downward from the vicinity of front end of the horizontal portion 33c. A lower end 33b of the temporary joint 33 ends in the vicinity of lower end 41a of a partitioning portion 41. The vertical portion 33d divides a clearance between partitioning portions 41 and 44A into two equal parts. An upper part of the partitioning portion 44A is parallel to a gas feed passage (or initially inflatable portion) 23, and joined with a panel portion 43. The temporary joint 34 is arranged within a main cell 30 located rearward of an auxiliary cell 31 in a rear protective portion 29. The temporary joint 34 includes a horizontal portion 34c in upper end part 34a, and a vertical portion 34d extending straightly downward from the vicinity of rear end of the horizontal portion 34c. The lower end 34b of the temporary joint 34 ends in the vicinity of lower end 44a of the partitioning portion 44A. The vertical portion 34d divides a clearance between the partitioning portion 44A and a peripheral portion 39 in rear edge 20c of the airbag body 20H into two equal parts in front-rear direction. An upper part of the partitioning portion 44A in the rear protective portion 29 is also parallel to a gas feed passage 23, and joined with the panel portion 43.

Figure 25:
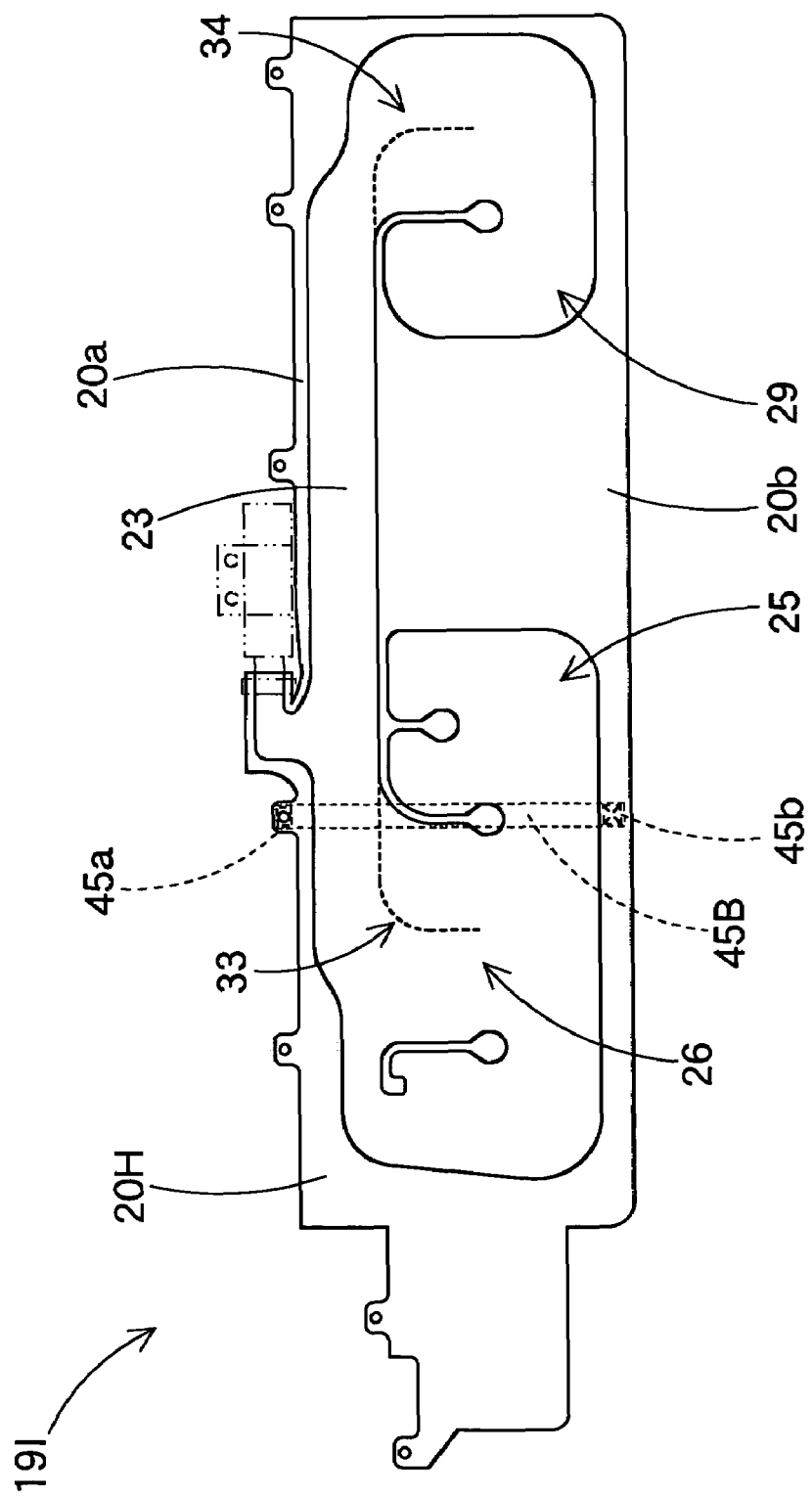
FIG. 25 is a front view of yet another embodiment of the airbag.

The airbag 19H also includes a belt 45 arranged obliquely as in the airbag 20 shown in FIG. 2. Here, an airbag 19I shown in FIG. 25 includes an airbag body 20H shown in FIG. 24 and a belt 45B arranged vertically, as the airbag 19G shown in FIG. 23. The airbag 19H is employed in Combinations 15, 18, 21 and 24 in Table 2, and the airbag 19I is employed in Combinations 14, 17, 20 and 23 in Table 2. The airbag 19 shown in FIG. 2 is employed in Combinations 27, 30, 33 and 36 in Table 3, and the airbag 19G shown in FIG. 23 is employed in Combinations 26, 29, 32 and 35 in Table 3.

"Folding type" line in each of Tables 1, 2 and 3 means folding method of an airbag. "Type I" represents a folding method of folding an airbag on folds along front-rear direction in a bellows-fashion all over the entire vertical area. "Type II" represents a folding method shown in FIG. 6, "Type III" represents a folding method shown in FIG. 19, and "Type IV" represents a folding method shown in FIG. 16.

"Belt" line in Tables 1, 2 and 3 shows whether an airbag includes a belt or not, and disposition of the belt. "None" means that the airbag includes an airbag body only but no belt, "Vertical" means that the airbag includes a belt 45B shown in FIGS. 23 and 25, and "Oblique" means that the airbag includes a belt 45 shown in FIGS. 2, 15 and 24.

Tables 1, 2 and 3 show results of inflation tests conducted on all the combinations (36 combinations) of kinds of airbag body and folding method, and existence or disposition of belt. The tests were conducted employing a vehicle in which a dummy's head is disposed away from side window for front seat at 25 mm. X in the results means that an airbag failed to enter in between window and dummy's head, and the airbag body completed inflation above the head. ○ means that the airbag entered in between window and dummy's head and completed inflation smoothly. Δ means that the airbag once entered in between window and dummy's head, but the entrance was hindered halfway and the airbag completed inflation above the head.

Tables 1, 2 and 3 teach that a head-protecting airbag enters in between occupants' heads approaching side windows and the side windows for protecting the heads properly only when the airbag body includes a temporary joint and a belt, and the airbag body is folded by a predetermined folding method. This means that the airbag cannot protect occupants' heads properly if it lacks any element of temporary joint, belt, or folding method.

What is claimed is:

1. A head-protecting airbag folded and housed in upper edges of side windows and deployable downwardly when fed with inflation gas, the airbag comprising:

an airbag body for covering the side windows upon deployment and a belt, the airbag body including a gas admissive portion and a non-admissive portion which admits no inflation gas, wherein;

the non-admissive portion includes a peripheral portion located in an outer edge of the airbag to encircle the gas admissive portion;

the gas admissive portion inflates by admitting inflation gas between an airbag's inner wall and an airbag's outer wall;

the gas admissive portion includes an initially inflatable portion located along an upper edge of the airbag body and admitting inflation gas in the initial stage of infla-tion, and a protective portion located below the initially inflatable portion and to be disposed at a side of an occupant's head as the airbag is completely inflated;

the protective portion includes a main cell having a temporary joint;

the temporary joint joins the inner wall and the outer wall together, and separates the inner wall and the outer wall when internal pressure of the protective portion rises along with inflation after the airbag is completely unfolded, the temporary joint includes a vertical portion disposed substantially along the vertical direction;

a lower end of the vertical portion ends halfway down an area of the protective portion such that the vertical portion is not connected with the peripheral portion at a lower edge of the airbag;

separation of the temporary joint proceeds from the lower end thereof to an upper end thereof whereby the main cell is inflated thinly before the separation of the inner wall and outer wall by the temporary joint, and inflated thickly after the separation;

the belt is located in an exterior side of the airbag body, an upper end of the belt being connected to the vicinity of an upper edge of the airbag body, and a lower end of the belt being connected to a position below the initially inflatable portion of the airbag body, whereby the belt pulls a lower part of the airbag body toward an exterior of a vehicle during deployment; and the airbag body is provided: in at least part of the initially inflatable portion, with a folded and piled portion formed by folding and piling the inner wall and outer wall on folds together with the belt; and, below the folded and piled portion, with a roll-folded portion rolled toward the exterior of the vehicle from a lower edge side, whereby the initially inflatable portion pushes out the protective portion downwardly when inflated with inflation gas.

2. The head-protecting airbag according to claim 1, wherein the main cell includes a gas inlet port at a lower part thereof, such tat the main cell admits inflation gas from a lower side thereof.

3. The head-protecting airbag according to claim 1, wherein the temporary joint in the main cell adjoins the initially inflatable portion at an upper end part thereof.

4. The head-protecting airbag according to claim 1, wherein an entire area of the initially inflatable portion is the folded and piled portion formed by folding and piling the inner wall and outer wall on folds, and an entire area below the initially inflatable portion is the roll-folded portion rolled toward the exterior of the vehicle from lower edge side.

5. The head-protecting airbag according to claim 4, wherein the folded and piled portion is formed by a bellows-folding method that folds and piles overlapped inner and outer walls in the vertical direction.

6. The head-protecting airbag according to claim 4, wherein the folded and piled portion is formed by folding and piling each of the inner and outer walls in the vertical direction.

7. The head-protecting airing according to claim 4, wherein the folded and piled portion is formed by folding and piling each of the inner and outer walls in an exterior-interior direction of the vehicle.

8. The head-protecting airbag according to claim 1, wherein:
the folded and piled portion is formed by bellows-folding a part of the initially inflatable portion in the vertical direction from a state in which the inner wall and outer wall are overlapped; and
a remaining portion of the initially inflatable portion below the folded and piled portion is located to encircle the roll-folded portion from an exterior side to a lower side thereof.

9. The head-protecting airbag according to claim 1, wherein:
the folded and piled portion is formed by bellows-folding overlapped inner and outer walls, and the roll-folded portion is located along a folding direction of the folded and piled portion; and
the airbag body is housed above side windows with the roll-folded portion located obliquely below and toward an exterior of the folded and piled portion.

10. The head-protecting airbag according to claim 1, wherein:
the folded and piled portion is formed by bellows-folding overlapped inner and outer walls, and the roll-folded portion is located along a folding direction of the folded and piled portion; and
the airbag body is housed above side windows with the roll-folded portion located obliquely below and toward an interior of the folded and piled portion.

11. The head-protecting airbag according to claim 1, wherein the tipper end of the belt is connected to either longitudinal end of the airbag body, and the lower end is connected to the vicinity of a longitudinal center in the lower edge of the airbag body.

12. The head-protecting airbag according to claim 1, wherein:
the airbag body covers an interior side of a plurality of side windows and a pillar located between the side windows; and
the upper and lower ends of the belt are located in the vicinity of the pillar.

13. The head-protecting airbag according to claim 1, wherein the temporary joint further includes:
a horizontal portion joining the inner and outer walls together and located at an upper end part of the main cell, and
two vertical portions, including the vertical portion, joining the inner and outer walls together and extending downwardly from the horizontal portion,
wherein the horizontal portion is located along a lower edge of the initially inflatable portion and disposed so that the initially inflatable portion and the protective portion are partitioned,
wherein each of the vertical portions extends straightly and vertically and ends substantially halfway down the protective portion whereby stress from inflation gas concentrates on a lower end of the temporary joint when the main cell is inflated.

14. The head-protecting airbag according to claim 13, wherein the vertical portions are spaced apart to partition the main cell into three equal parts.

* * * * *